US010565757B2

(12) United States Patent
Oxholm et al.

(10) Patent No.: US 10,565,757 B2
(45) Date of Patent: Feb. 18, 2020

(54) MULTIMODAL STYLE-TRANSFER NETWORK FOR APPLYING STYLE FEATURES FROM MULTI-RESOLUTION STYLE EXEMPLARS TO INPUT IMAGES

(71) Applicant: Adobe Inc., San Jose, CA (US)

(72) Inventors: Geoffrey Oxholm, San Francisco, CA (US); Xin Wang, Goleta, CA (US)

(73) Assignee: Adobe Inc., San Jose, CA (US)

( * ) Notice: Subject to any disclaimer, the term of this patent is extended or adjusted under 35 U.S.C. 154(b) by 7 days.

(21) Appl. No.: 15/619,114

(22) Filed: Jun. 9, 2017

(65) Prior Publication Data

US 2018/0357800 A1 Dec. 13, 2018

(51) Int. Cl.
*G09G 5/00* (2006.01)
*G06T 11/60* (2006.01)
*G06T 3/40* (2006.01)

(52) U.S. Cl.
CPC ............. *G06T 11/60* (2013.01); *G06T 3/40* (2013.01)

(58) Field of Classification Search
CPC ........... G06T 11/00; G06T 2207/20221; G06T 2207/20081; G06T 3/4046; G06T 3/4053; G06N 3/0454
See application file for complete search history.

(56) References Cited

U.S. PATENT DOCUMENTS

2018/0068463 A1* 3/2018 Risser .................. G06T 7/45

OTHER PUBLICATIONS

Michael Elad and Peyman Milanfar, Style-Transfer via Texture-Synthesis, arXiv:1609.03057v3 [cs.CV] Sep. 20, 2016.*
Ashikhmin, N, "Fast Texture Transfer", IEEE Computer Graphics and Applications, vol. 23, Issue 4, Jul.-Aug. 2003, 6 pages.
Denton, Emily, et al, "Deep Generative Image Models Using a Laplacian Pyramid of Adversarial Networks", In Advances in Neural Information Processing Systems, Jun. 2015. 9 pages.

(Continued)

*Primary Examiner* — Weiming He
(74) *Attorney, Agent, or Firm* — Kilpatrick Townsend & Stockton LLP

(57) ABSTRACT

A computing system transforms an input image into a stylized output image by applying first and second style features from a style exemplar. The input image is provided to a multimodal style-transfer network having a low-resolution-based stylization subnet and a high-resolution stylization subnet. The low-resolution-based stylization subnet is trained with low-resolution style exemplars to apply the first style feature. The high-resolution stylization subnet is trained with high-resolution style exemplars to apply the second style feature. The low-resolution-based stylization subnet generates an intermediate image by applying the first style feature from a low-resolution version of the style exemplar to first image data obtained from the input image. Second image data from the intermediate image is provided to the high-resolution stylization subnet. The high-resolution stylization subnet generates the stylized output image by applying the second style feature from a high-resolution version of the style exemplar to the second image data.

20 Claims, 10 Drawing Sheets
(6 of 10 Drawing Sheet(s) Filed in Color)

(56) References Cited

OTHER PUBLICATIONS

Dosovitskiy, Alexey, et al, "Learning to generate chairs with convolutional neural networks", In Proceedings of the IEEE Conference on Computer Vision and Pattern Recognition, Jun. 2015, 9 pages.
Efros, Alexei, et al., "Image Quilting for Texture Synthesis and Transfer", In Proceedings of the 28th Annual Conference on Computer Graphics and Interactive Techniques, ACM, Aug. 2001, 6 pages.
Efros, Alexei, et. al., "Texture Synthesis by Nonparametric Sampling", In Computer Vision, 1999, The Proceedings of the Seventh IEEE International Conference, vol. 2, Sep. 1999, 6 pages.
Gatys, Leon A., et al., "Texture Synthesis Using Convolutional Neural Networks", In Advances in Neural Information Processing Systems, May 2015, 9 pages.
Gatys, Leon A., et al, "Preserving Color in Neural Artistic Style Transfer", arXiv preprint arXiv:1606.05897, Jun. 2016, 8 pages.
Gatys, Leon A., et al, "Image Style Transfer Using Convolutional Neural Networks", . In Proceedings of the IEEE Conference on Computer Vision and Pattern Recognition, Jun. 2016, 10 pages.
Goodfellow, Ian J, et al., "Generative Adversarial Nets", In Advances in Neural Information Processing Systems, Jun. 2014, 9 pages.
He, Kaiming, et al, "Deep Residual Learning for Image Recognition", In Proceedings of the IEEE Conference on Computer Vision and Pattern Recognition, Jun. 2016, 9 pages.
Hertzmann, Aaron, et al., "Image Analogies", In Proceedings of the 28th annual conference on Computer graphics and interactive techniques, ACM, Aug. 2001, 14 pages.
Ioffe, Sergey.,et al., "Batch Normalization: Accelerating Deep Network Training by Reducing Internal Covariate Shift", .arXiv preprint arXiv:1502.03167, Mar. 2015, 11 pages.
Johnson, Justin, et al., "Perceptual Losses for Real-Time Style Transfer and Super-Resolution", In European Conference on Computer Vision, Springer, Mar. 2016, 17 pages.
Kingma, Diederik, et al, "A Method for Stochastic Optimization", published at ICLR 2015, arXiv preprint arXiv:1412.6980, Jan. 2017, 15 pages.
Krizhevsky, Alex, et al, "Imagenet Classification With Deep Convolutional Neural Networks", In Advances in Neural Information Processing Systems, Dec. 2012, 9 pages.
Kwatra, Vivek, et al, "Graphcut Textures: Image and Video Synthesis Using Graph Cuts", In ACM Transactions on Graphics (Tog), vol. 22, ACM, Jul. 2003, 10 pages.
Lee,Hochang, et al., "Directional Texture Transfer", In Proceedings of the 8th International Symposium on Non-Photorealistic Animation and Rendering, ACM, Jun. 2010, 2 pages.
Lin, Tsung-Yi, et al, "Microsoft Coco: Common Objects in Context", In European Conference on Computer Vision, Springer, 2014, reprint arXiv 1405.0312v3 , Feb. 2015, 15 pages.
Mahendran, Aravindh, et al, "Understanding Deep Image Representations by Inverting Them", In 2015 IEEE Conference on Computer Vision and Pattern Recognition (CVPR), IEEE, 2015, 9 pages.
Nguyen, Anh, et al., "Deep Neural Networks Are Easily Fooled: High Confidence Predictions for Unrecognizable Images", In 2015 IEEE Conference on Computer Vision and Pattern Recognition (CVPR), IEEE, 2015, 10 pages.
Odena, Augustus, et al., Deconvolution and Checkerboard Artifacts, http://distill.pub/2016/deconvcheckerboard/, Oct. 2016, 8 pages.
Radford, Alec, et al., "Unsupervised Representation Learning With Deep Convolutional Generative Adversarial Networks", arXiv preprint arXiv:1511.06434, Nov. 2015, reprinted Jan. 2016. 16 pages.
Simonyan, Karen, et al., Deep Inside Convolutional Networks: Visualising Image Classification Models and Saliency Maps, arXiv preprint arXiv:1312.6034, Dec. 2013, preprint Apr. 2014, 8 pages.
Simonyan, Karen et al., "Very Deep Convolutional Networks for Large-Scale Image Recognition", arXiv preprint arXiv:1409.1556, v6, 2014, Sep. 2014. preprint Apr. 2015, 14 pages.
Ulyanov, Dmitry, et al., "Texture Networks: Feed-Forward Synthesis of Textures and Stylized Images", In Int. Conf. on Machine Learning (ICML), Mar. 2016, 9 pages.
Ulyanov, Dmitry, et al, "Instance normalization: The missing ingredient for fast stylization", arXiv preprint arXiv:1607.08022, ,Jul. 2016, preprint Sep. 2016, 6 pages.
Wandell, Brian A, "Foundations of Vision", Sinauer Associates, Sep. 1995, parts 1-5 of Book, 17 pages.
Wei, Li-Yi, et al,, "Fast Texture Synthesis Using Tree Structured Vector Quantization", In Proceedings of the 27th Annual Conference on Computer Graphics and Interactive Techniques, ACM Press/ Addison-Wesley Publishing Co., 2000, 10 pages.
Yosinski, Jason, et al., "Understanding Neural Networks Through Deep Visualization", arXiv preprint arXiv:1506.06579, Jun. 2015, 12 pages.
Zeiler, Matthew D., et al., "Visualizing and Understanding Convolutional Networks", In European Conference on Computer Vision, Springer, 2014, arXiv1311.2901v3. Nov. 2013, 11 pages.

\* cited by examiner

MULTIMODAL STYLE-TRANSFER NETWORK FOR APPLYING STYLE FEATURES FROM MULTI-RESOLUTION STYLE EXEMPLARS TO INPUT IMAGES

TECHNICAL FIELD

This disclosure relates generally to machine-learning systems that transform an image to enhancing its visual quality by selectively combining the image's content with content from other images. More specifically, but not by way of limitation, this disclosure relates to applying style features from multi-resolution style exemplars to input images using a multimodal style-transfer network.

BACKGROUND

Image manipulation applications are often used to edit the color, contrast, and tonal distributions of images for stylistic reasons. These edits can be performed by modifying properties such as color hue, tint, saturation, and contrast using image manipulation applications. One way of altering the appearance of an image to achieve a desired change to the image involves a style transfer. Transferring a "style" involves applying one or more color-changing or contrast-changing filters or other operations to an image. For instance, style transfers executed by image manipulation applications use examples of stylized images (also known as "style exemplars") to identify a style that is to be applied to an image. The color and contrast of a given style exemplar controls how the image manipulation application alters the color and contrast of the input image to generate an output image. Color schemes or other style features may be modified in the input image to match the color scheme or other style features of a style exemplar. Using style exemplars can allow users to intuitively identify color schemes, contrast schemes, or style feature of interest that are to be applied to an input image.

For example, FIG. 1 is a block diagram depicting an example of modifying style features of an input image 102 using a style exemplar 106. An image manipulation application performs one or more stylization processes 104 that globally or locally transform color information and contrast information of the input image 102 in accordance with a style exemplar 106. In one example, the input image 102 is transformed into the output image 108 by applying a stylization process 104 that transfers textural features of the style exemplar 106 to the input image 102.

Conventional style-transfer networks present disadvantages. For instance, style-transfer processes are trained on a specific resolution of the style exemplars. But if a trained style-transfer network is applied to images with resolutions that are different from that specific resolution, sub-optimal style transfers will result. For instance, applying a style-transfer network trained with a style exemplar guide with a size of 256×256 to higher-resolution images would generate results whose texture scale is smaller than that of the artistic style. In another example, conventional style-transfer processes often fail to accurately transfer small, intricate textures (e.g., brushwork), which are found in many kinds of artwork, from style exemplars to high-resolution input images. Thus, conventional style-transfer solutions are often unsatisfactory for transferring a wide variety of artistic styles from a style exemplar to an input image.

SUMMARY

Certain embodiments involve applying style features from multi-resolution style exemplars to input images using a multimodal style-transfer network. For example, a computing system transforms an input image into a stylized output image by applying, to the input image, first and second style features from a style exemplar. To do so, the input image is provided to a multimodal style-transfer network, which includes a low-resolution-based stylization subnet and a high-resolution stylization subnet. The low-resolution-based stylization subnet is trained with low-resolution style exemplars to apply the first style feature. The high-resolution stylization subnet is trained with high-resolution style exemplars to apply the second style feature. The low-resolution-based stylization subnet generates an intermediate image by applying the first style feature from a low-resolution version of the style exemplar to first image data obtained from the input image. Second image data from the intermediate image is provided to the high-resolution stylization subnet. The high-resolution stylization subnet generates the stylized output image by applying the second style feature from a high-resolution version of the style exemplar to the second image data.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Features, embodiments, and advantages of the present disclosure are better understood when the following Detailed Description is read with reference to the accompanying drawings.

DETAILED DESCRIPTION

Figure 1:
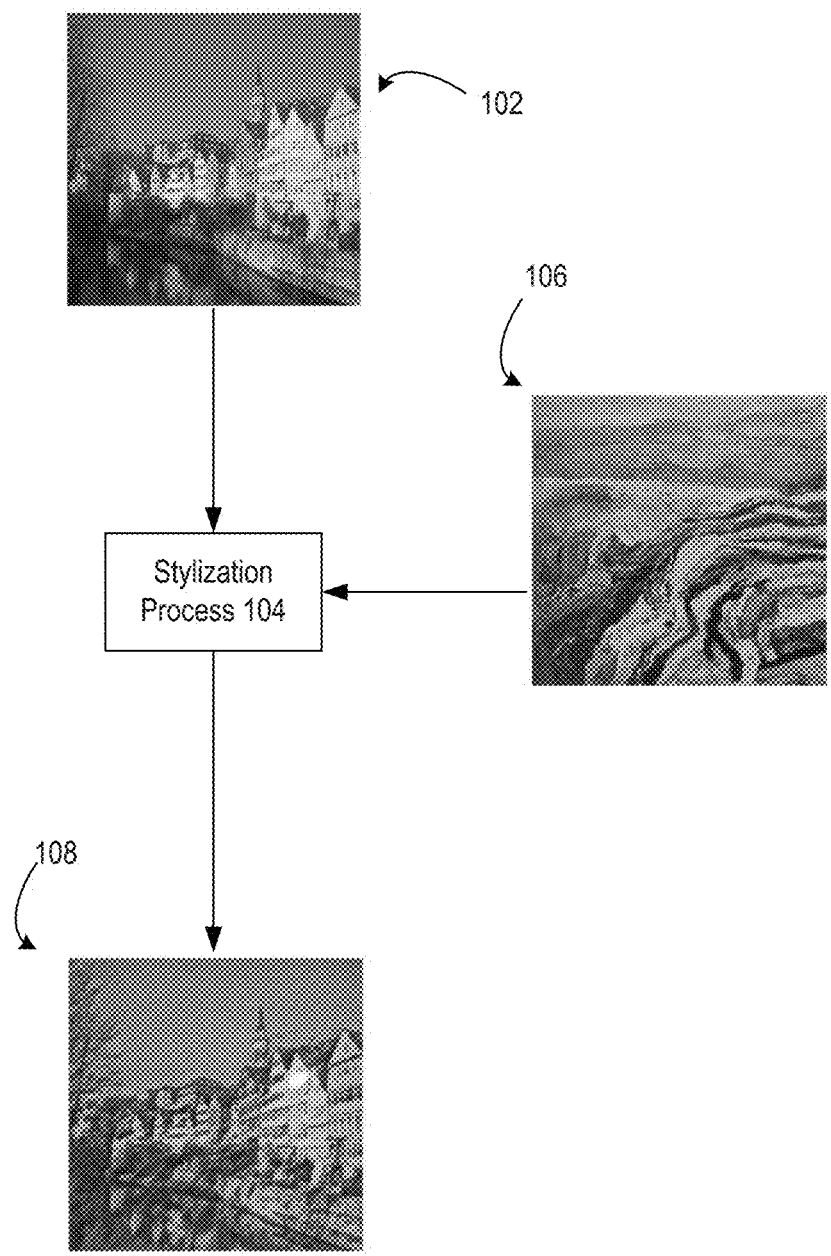
FIG. 1 depicts an example of modifying style features of an image, according to certain embodiments of the present disclosure.

Certain embodiments involve a multimodal style-transfer algorithm that performs style transfers on an input image using different style-exemplar resolutions. The multimodal style-transfer algorithm uses, for example, a style-transfer network having sequentially-connected stylization subnets in a deep convolutional, neural network architecture. Style transfer networks involve machine-learning networks that receive an input image and a style exemplar as inputs and apply a series of transformations that apply style features of the style exemplar to the input image, where the style-transfer network is trained with a certain loss criterion that represents a degree to which the style of an output image matches the style of a style exemplar. In embodiments described herein, the different stylization subnets, which correspond to different resolutions of a style exemplar and input image, are used for different "modes" of style transfer with respect to the input image. In a simplified example, the style-transfer network is trained to recognize both coarse style features (e.g., large-scale texture distortion) from a style exemplar at a first resolution and detailed style features (e.g., fine, exquisite brushwork of an artistic style) from the style exemplar at a second resolution. Training this multimodal style-transfer network allows the multimodal style-transfer algorithm to combine multiple style-transfer modes into a common style-transfer process, thereby allowing the multimodal style-transfer algorithm to apply a wider variety of styles to an input image as compared to existing style-transfer solutions.

The following non-limiting example is provided to introduce certain embodiments. In this example, a creative apparatus accesses an input image and a style exemplar. The input image may be transferred from a digital camera, downloaded from a website, received from a client device, etc. The style exemplar, which may be a photograph or a drawing, includes a set of varying-resolution versions of the same style exemplar (e.g., a 256×256 version, 512×512 version, and a 1024×1024 version). An image manipulation application executed by the creative apparatus uses a multimodal style-transfer network, which includes at least a low-resolution stylization subnet and a high-resolution stylization subnet, to transform the input image into a stylized output image using the style exemplar.

For instance, the image manipulation application applies a first style feature from a first version of the style exemplar, which has a first resolution, to a down-sampled version of the input image, which also has the first resolution. The first style feature is applied by the low-resolution stylization subnet, which has been trained using low-resolution style exemplars to recognize and transfer a first type of style feature. For instance, the low-resolution stylization subnet extracts certain features from the input image data, such as features defined by a color space (e.g., the red-green-blue ("RGB") color space), features defined by a luminance channel, or both. The low-resolution stylization subnet modifies the extracted features based on style data extracted from the style exemplar. Applying the first style feature generates an intermediate image, which is semantically similar to the input image and with greater similarity (i.e., high feature responses) with respect to certain desired style features from the style exemplar and lower similarity (i.e., low feature responses) with respect to other desired style features from the style exemplar.

To further stylize the input image, the image manipulation application up-samples the intermediate image to a second resolution and applies a second style feature from a second version of the style exemplar, which also has the second resolution, to the up-sampled version of the intermediate image. The second style feature is applied by the high-resolution stylization subnet, which has been trained using high-resolution style exemplars to recognize and transfer a second type of style feature. Applying the second style feature generates stylized output image, which retains the semantic similarity to the input image while having more of the desired style features from the style exemplar.

For illustrative purpose, the operation of the multimodal style-transfer network has been described using two stylization subnets (i.e., a low-resolution stylization subnet and a high-resolution stylization subnet). But the process described above can be iterated with any suitable number of additional stylization subnets, which are trained with style exemplars of progressively higher resolutions.

As used herein, the terms "low-resolution" and "high-resolution" are used to describe a set of at least two different resolution levels. For instance, a "low-resolution" image or stylization subnet involves lower resolutions as compared to a "high-resolution" image or stylization subnet. Thus, a stylization subnet that is optimized for image data and style exemplars having a resolution of 512×512 is a "high-resolution" stylization subnet with respect to another subnet optimized for image data and style exemplars having a resolution of 256×256, while also being a "low-resolution" stylization subnet with respect to another subnet optimized for image data and style exemplars having a resolution of 1024×1024.

As used herein, the term "style exemplar" is used to refer to an image or graphic having an image style that is used to modify another image in a style-transfer operation.

As used herein, the term "style-transfer operation" is used to refer to any operation that modifies color information, contrast information, or other style characteristics from a style exemplar to modify color information, contrast information, or other style characteristics in another image. For example, a style transfer operation may modify color information, contrast information, or both in an input image based on the color and contrast information in a style exemplar.

As used herein, the term "semantic similarity" is used to refer to a similarity between a first set of shapes and spatial relationships in a first image and a second set of shapes and spatial relationships in a second image. In one example, an image of a person's face has a higher semantic similarity to an image of another person and a lower semantic similarity to an image of a building. In another example, an image of two people standing close together has a higher semantic similarity to an image of a crowd of people and a lower semantic similarity to an image of a single person.

As used herein, the terms "image style" and "style feature" are used to refer to image statistics for one or more attributes such as color information, contrast information, and other quantifiable attributes of an image. Examples of color information include a global distribution of colors within an image, local color distributions at certain portions of an image, etc. Examples of contrast information include local contrast, lighting direction, textures in artwork resulting from certain types of brushstrokes, etc. The term "style data" is used to refer to any data describing an image style or style feature that can be used by an image manipulation application to transfer the image style or style feature to a target image.

Certain embodiments described herein improve automated style-transfer systems by accurately transferring both coarse and intricate texture patterns from a style exemplar to an input image. For instance, a multimodal style-transfer network is trained with multiple stylization losses at different resolutions. This training process allows the multimodal style-transfer network to learn different levels of textures, including style, color, large texture distortion, and fine brushwork. In contrast with existing systems, in which a given style-transfer network is trained with a style exemplar of a single resolution and thereby learns a single type of style feature, embodiments described herein can stylize the same input image with multiple, distinct artistic styles. For instance, style transfers via a multimodal style-transfer network can simulate the brushwork of the artwork more closely than existing, single-mode style-transfer networks.

Figure 2:
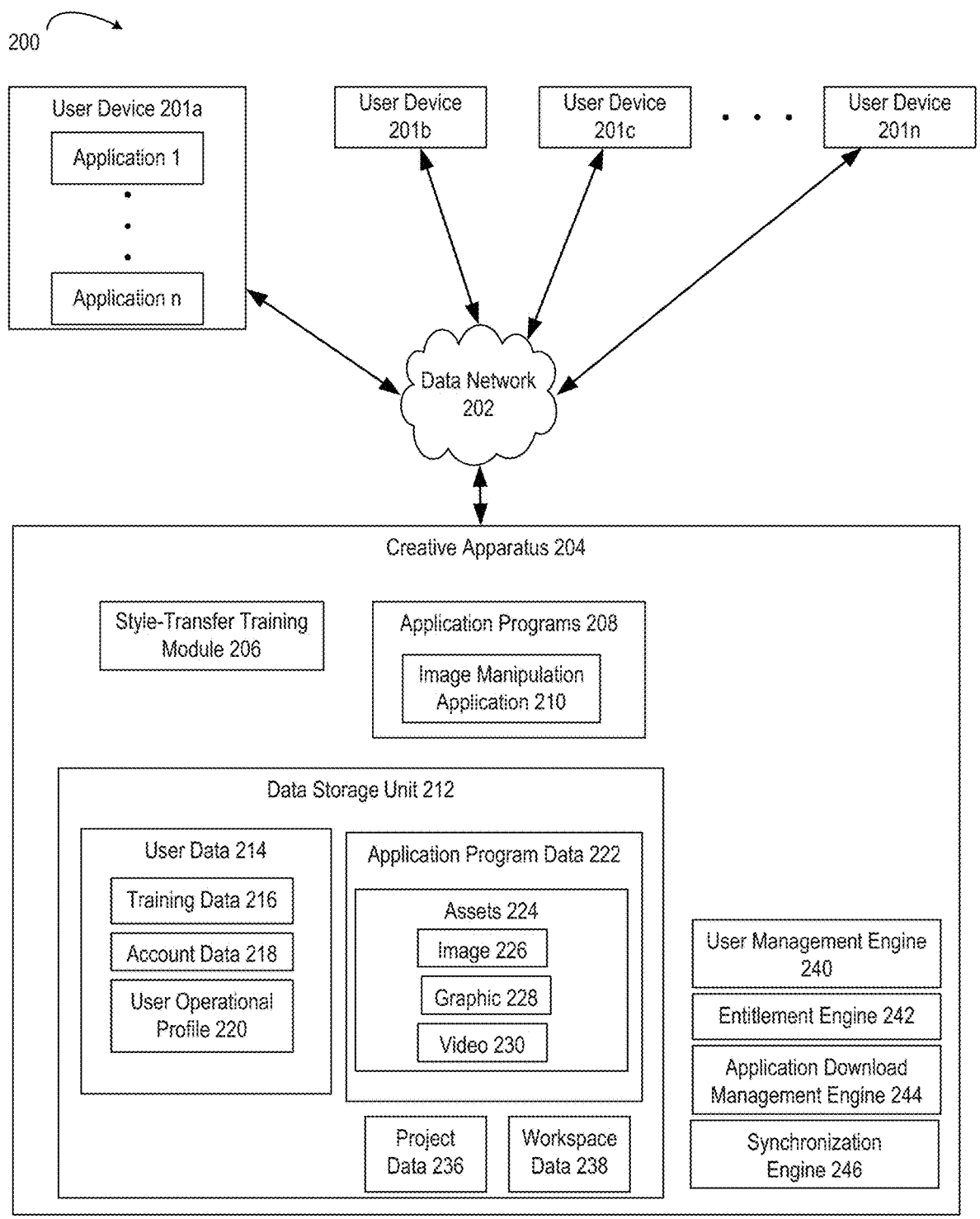
FIG. 2 depicts an example of a network environment for using an image manipulation application to apply multimodal style transfers to input images, according to certain embodiments of the present disclosure.

Example of an Operating Environment for Using a Multimodal Style-Transfer Network Referring now to the drawings, FIG. 2 depicts an example of a network environment 200 for applying style features from multi-resolution style exemplars to input images using a multimodal style-transfer network. In the example depicted in FIG. 2, various user devices 201a-n access a creative apparatus 204 via one or more data networks 202. The creative apparatus 204 executes one or more style-transfer training modules 206 (or other suitable program code) for performing one or more functions used in generating a multimodal style-transfer network using training data 216.

A multimodal style-transfer network can be used for applying style features from multi-resolution style exemplars to input images in one or more applications or services that are available via the creative apparatus 204 (e.g., an image manipulation application 210). Examples of operations for training and using a multimodal style-transfer network are described in further detail with respect to FIGS. 3-12.

Some embodiments of the network environment 200 include user devices 201a-n. Examples of a user device include, but are not limited to, a personal computer, tablet computer, a desktop computer, a processing unit, any combination of these devices, or any other suitable device having one or more processors. Each user device includes at least one application supported by the creative apparatus 204. User devices 201a-n correspond to various users. Examples of the users include, but are not limited to, creative professionals or hobbyists who use creative tools to generate, edit, track, or manage creative content, marketing professionals who use marketing tools to generate, edit, track, or manage online content, or to manage online marking processes, end users, administrators, users who use image tools to create, edit, track, or manage images, advertisers, publishers, developers, content owners, content managers, content creators, content viewers, content consumers, designers, editors, any combination of these users, or any other user who uses digital tools to create, edit, track, or manage digital experiences.

Digital tools, as described herein, include tools such as the image manipulation application 210 that are used to perform a function or a workflow electronically. Examples of a digital tool include, but are not limited to, a creation tool, content editing tool, content publishing tool, content tracking tool, content managing tool, content printing tool, content consumption tool, any combination of these tools, or any other tool that can be used for creating, editing, managing, generating, tracking, consuming or performing any other function or workflow related to content. Digital experience, as described herein, includes experience that can be consumed through an electronic device. Examples of the digital experience include content creating, content editing, content tracking, content publishing, content posting, content printing, content managing, content viewing, content consuming, any combination of these experiences, or any other workflow or function that can be performed related to content. Content, as described herein, includes electronic content. Examples of content include, but are not limited to, image, video, website, webpage, user interface, menu item, tool menu, magazine, slideshow, animation, social post, comment, blog, data feed, audio, advertisement, vector graphic, bitmap, document, any combination of one or more content, or any other electronic content.

Each of the user devices 201a-n is communicatively coupled to the creative apparatus 204 via one or more data networks 202. A user of a user device can use various products, applications, or services supported by the creative apparatus 204 via the data network 202. Examples of the data network 202 include, but are not limited to, the internet, a local area network, a wireless area network, a wired area network, a wide area network, and the like.

The creative apparatus 204 includes one or more engines for providing one or more digital experiences to the user. In some embodiments, these engines include one or more of the engines depicted in FIG. 2. In other embodiments, one or more of the engines depicted in FIG. 2 may be omitted from a creative apparatus 204.

The creative apparatus 204 can be implemented using one or more servers, one or more processing devices, one or more platforms with corresponding application programming interfaces, cloud infrastructure, or the like. In addition, each engine can also be implemented using one or more servers, one or more processing devices, one or more platforms with corresponding application programming interfaces, cloud infrastructure, or the like.

The creative apparatus 204 includes a data storage unit 212. The data storage unit 212 can be implemented as one or more databases or one or more data servers. The data storage unit 212 includes data that is used by the style-transfer training module 206 and other engines of the creative apparatus 204.

The user uses one or more application programs 208, which can include the image manipulation application 210, to create one or more projects or assets. In addition, the user also has a workspace within each application program. The workspace, as described herein, includes setting of the application program, setting of tools or setting of user interface provided by the application program, and any other setting or properties specific to the application program. Each user has a workspace. The workspace, the projects or the assets are stored as application program data 222 in the data storage unit 212 by a synchronization engine 246. The application program data 222 can be specific to the user or can be shared with other users based on rights management.

In some embodiments, the application program data 222 includes one or more assets 224. The assets 224 may include shared assets that the user wants to share with other users or that the user wants to offer on a marketplace. The assets 224 can also be shared across multiple application programs 208. In some embodiments, each asset includes metadata.

In some embodiments, each asset also includes a file. Examples of the file include, but are not limited to, an image 226, a graphic 228, a video 230, a combination of any of these, and the like. In another embodiment, an asset only includes the metadata. The application program data 222 also includes project data 236 and workspace data 238. In some embodiments, the project data 236 includes copies of the assets 224 or the assets 224 themselves. In additional or alternative embodiments, the assets 224 are standalone assets. Similarly, the workspace data 238 can be part of the project data 236 in some embodiments and may be stand-alone data in other embodiments.

In some embodiments, the user can have one or more user devices (e.g., user devices 201a-n). The application program data 222 is accessible by the user from any device (e.g., device 201b), including a device that was not used to create the assets 224 (e.g., device 201c). This is achieved by the synchronization engine 246 that stores the application program data 222 in the data storage unit 212 and makes the application program data 222 available for access by the user or other users via any device. Before accessing the application program data 222 by the user from any other device or by any other user, the user or the other user may need to provide login details for authentication if not already logged in. Otherwise, if the user or the other user is logged in, then a newly created asset or updates to the application program data 222 are provided in real time. The workspace data 238 enables the synchronization engine 246 to provide same workspace configuration to the user on any other device or to the other user based on rights management data.

In some embodiments, a user of one or more of the user devices 201a-n visits a webpage or an application store to explore applications supported by the creative apparatus 204 (e.g., the image manipulation application 210). The creative apparatus 204 provides the applications (e.g., the image manipulation application 210) as a software as a service ("SaaS"), or as a standalone application that can be installed on the user device 201, or as a combination.

In some embodiments, the user creates an account with the creative apparatus 204 by providing user details and by creating login details. Alternatively, the creative apparatus 204 can automatically create login details for the user in response to receipt of the user details. In some embodiments, the user is also prompted to install an application manager. The application manager enables the user to manage installation of various applications supported by the creative apparatus 204 and to manage other functionalities, such as updates, subscription account and the like, associated with the applications. The user details are received by a user management engine 240 and stored as user data 214 in the data storage unit 212. In some embodiments, the user data 214 further includes account data 218 under which the user details are stored.

In some embodiments, the user either can opt for a trial account or can make payment based on the type of account or subscription chosen by the user. Alternatively, the payment can be based on product or number of products chosen by the user. In some embodiments, based on payment details of the user, a user operational profile 220 is generated by an entitlement engine 242. The user operational profile 220 is stored in the data storage unit 212 and indicates entitlement of the user to various products or services. In some embodiments, the user operational profile 220 also indicates type of user, i.e. free, trial, student, discounted, or paid. In some embodiments, the user management engine 240 and the entitlement engine 242 can be one single engine performing the functionalities of both the engines.

In some embodiments, the user installs various applications supported by the creative apparatus 204 via an application download management engine 244. Application installers or application programs 208 (which may include the image manipulation application 210 or other software usable to perform operations described herein) are present in the data storage unit 212 and are fetched by the application download management engine 244. These applications are made available to the user directly or via the application manager. In some embodiments, all application programs 208 are fetched and provided to the user via an interface of the application download management engine 244. In other embodiments, application programs 208 for which the user is eligible based on user's operational profile are displayed to the user. The user selects the application programs 208 that the user wants to download. The application programs 208 are downloaded on one or more of the user devices 201a-n by the application manager via the application download management engine 244. Corresponding data regarding the download is also updated in the user operational profile 220. An application program 246 is an example of a digital tool. The application download management engine 244 also manages a process of providing updates to the user device 201.

In some embodiments, upon download, installation, and launching of an application program, the user is asked to provide the login details. A check is again made by the user management engine 240 and the entitlement engine 242 to ensure that the user is entitled to use the application program. In other embodiments, direct access is provided to the application program as the user is already logged into the application manager.

Examples of Training and Using a Multimodal Style-Transfer Network

As described in detail with respect to the various examples below, the style-transfer training module 206 is used to develop and use a multimodal style-transfer network according to various embodiments. For instance, a multimodal style-transfer network is trained, optimized, generated, or otherwise modified by the style-transfer training module 206. The multimodal style-transfer network is used to apply multiple style features from varied-resolution versions of style exemplars to input images.

Figure 3:
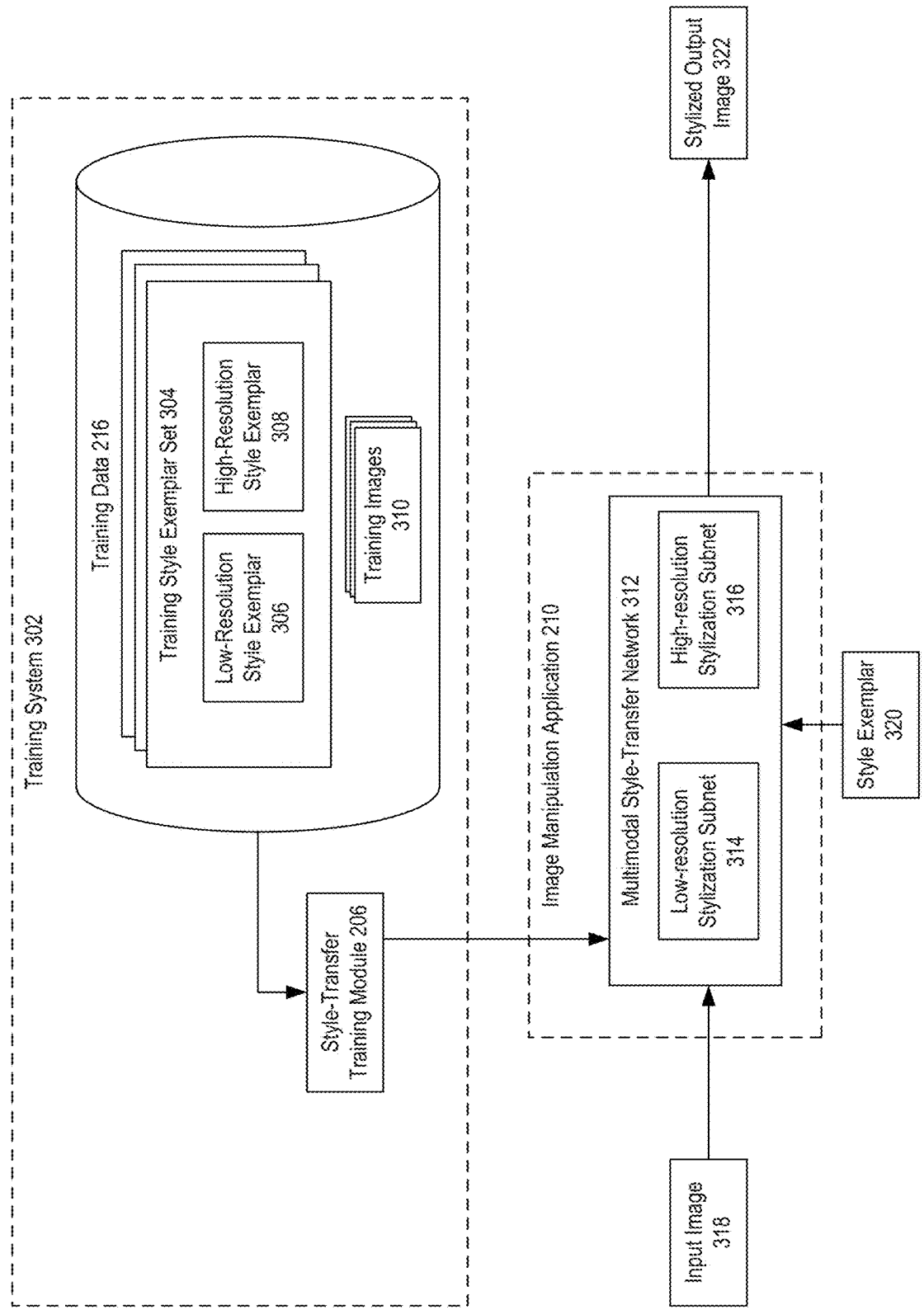
FIG. 3 depicts an example of a communications flow for generating and using a multimodal style-transfer network to transform an input image into a stylized output image by applying style features from multi-resolution style exemplars, according to certain embodiments of the present disclosure.

FIG. 3 depicts an example of a communications flow for generating and using a multimodal style-transfer network to transform an input image into a stylized output image by applying style features from multi-resolution style exemplars. In this example, a training system 302 uses training data 216 for training a multimodal style-transfer network to hierarchically stylize input images using different style exemplars. The training system 302 includes the style-transfer training module 206 and the training data 216. In some embodiments, the training system 302 also includes hardware such as a processing device that executes the style-transfer training module 206 and a non-transitory computer-readable medium and associated data structures that store the training data 216.

The training system 302 executes the style-transfer training module 206 to generate, train, or otherwise develop a multimodal style-transfer network 312 based on the training data 216. The style-transfer training module 206 uses training style exemplar sets 304 and training images 310 to do so. A training style exemplar set 304 includes versions of a style exemplar at different resolutions, such as a low-resolution style exemplar 306 and a high-resolution style exemplar 308. Low-resolution style exemplars 306 are used to train a low-resolution stylization subnet 314 of the multimodal style-transfer network 312, which allows the multimodal style-transfer network 312 to learn and apply certain types of style features to input images 318. High-resolution style exemplars 308 are used to train a high-resolution stylization subnet 316 of the multimodal style-transfer network 312, which allows the multimodal style-transfer network 312 to learn and apply other types of styles features to input images 318. Detailed examples of training the multimodal style-transfer network 312 are described herein with respect to FIGS. 5-7.

The style-transfer training module 206 outputs the multimodal style-transfer network 312 for use by an image manipulation application 210 (e.g., by transmitting the multimodal style-transfer network 312 to a computing device that executes the image manipulation application 210, by storing the multimodal style-transfer network 312 in a non-transitory computer-readable medium accessible the image manipulation application 210, etc.). The multimodal style-transfer network 312 can be used to stylize input images 318 using a low-resolution stylization subnet 314 and a high-resolution stylization subnet 316 and thereby generate a stylized output image 322. An example of using the multimodal style-transfer network 312 to do so is depicted in FIG. 4.

Figure 4:
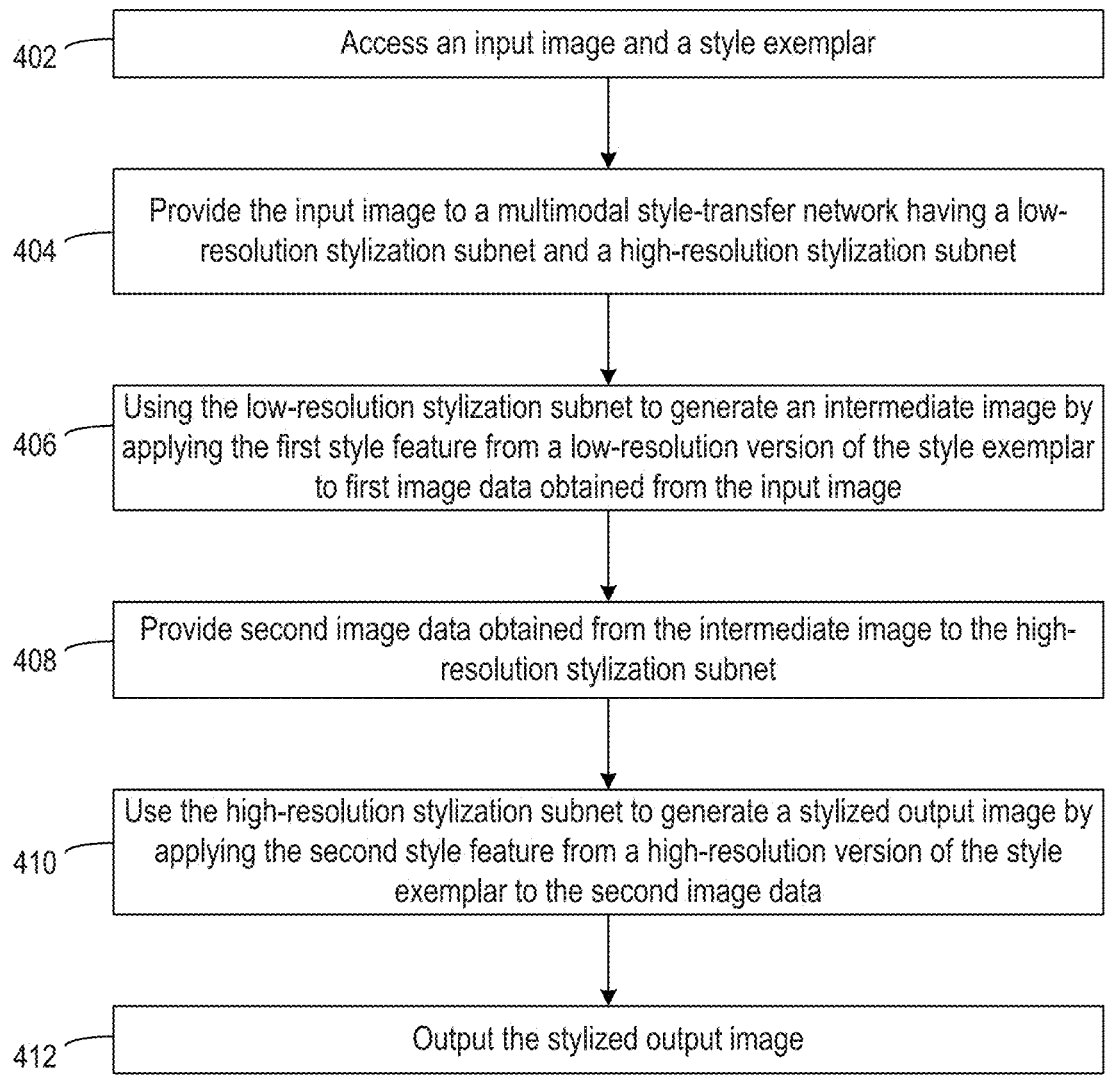
FIG. 4 depicts an example of a process for using a multimodal style-transfer network to apply style features from multi-resolution style exemplars to input images, according to certain embodiments of the present disclosure.

FIG. 4 depicts an example of a process 400, which may be performed by the creative apparatus 204 or another suitable computing system, for using a multimodal style-transfer network to apply style features from multi-resolution style exemplars to input images. In some embodiments, one or more processing devices implement operations depicted in FIG. 4 by executing suitable program code (e.g., the image manipulation application 210). For illustrative purposes, the process 400 is described with reference to certain examples depicted in the figures. Other implementations, however, are possible.

At block 402, the process 400 involves accessing an input image and a style exemplar. In some embodiments, as described above with respect to FIG. 3, the style exemplar includes multiple versions, such as a low-resolution version of the style exemplar and a high-resolution version of the style exemplar. Accessing the input image may include, for example, the creative apparatus 204 retrieving the input image from a memory device to which a temporary version of the input image has been stored after the creative apparatus 204 has received the input image from a user device 201. Additionally or alternatively, accessing the input image may include a user device 201 retrieving the input image from a memory device to which the user device has stored the input image after downloading the input image (e.g., from a digital camera connected to the user device 201).

One or more processing devices execute the image manipulation application 210 (or suitable other program code) to implement block 402. Executing the image manipulation application 210 causes one or more processing devices to access the input image 318 that is stored in a non-transitory computer-readable medium. In some embodiments, accessing the input image involves communicating, via a data bus, suitable signals between a local non-transitory computer-readable medium and the processing device. In additional or alternative embodiments, accessing the input image involves communicating, via a data network, suitable signals between a computing system that includes the non-transitory computer-readable medium and a computing system that includes the processing device.

At block 404, the process 400 involves providing the input image to a multimodal style-transfer network having a low-resolution stylization subnet and a high-resolution stylization subnet. One or more processing devices execute the image manipulation application 210 or other program code to implement block 404. Executing the image manipulation application 210 causes the processing device to perform a multimodal style-transfer algorithm. The multimodal style-transfer algorithm includes one or more sets of operations that implement the operations modeled by the multimodal style-transfer networks described herein.

For example, a module of the multimodal style-transfer algorithm includes one or more operations corresponding to the low-resolution stylization subnet 314. The processing device implements block 404 by providing first image data, which is obtained from the input image 318, as an input to this module. In some embodiments, the image manipulation application 210 obtains the first image data by creating a downsampled version of the input image 318. For instance, an input image 318 having a resolution of 1024×1024 may be downsampled to a resolution of 256×256. The downsampled version of the downsampled version of the input is the input to the low-resolution stylization subnet 314.

At block 406, the process 400 involves using the low-resolution stylization subnet to generate an intermediate image by applying the first style feature from a low-resolution version of the style exemplar to first image data obtained from the input image. One or more processing devices execute the image manipulation application 210 or other program code to implement block 406. For instance, a module corresponding to the low-resolution stylization subnet 314 can perform one or more feature-extraction operations and one or more convolution operations. Examples of the feature-extraction operations include generating a feature map based on color or luminance information in the first image data. Examples of the convolution operations include generating a new image (i.e., generating pixels) with lower loss values, which has the effect of using style data obtained from a low-resolution version of a style exemplar in combination with feature data from a feature map of the first image data to generate a stylized output image.

The style data used at block 406 includes the first style feature associated with the low-resolution stylization subnet 314. In a training process for the multimodal style-transfer network 312, the low-resolution stylization subnet 314 is trained to recognize certain types of style features using low-resolution style exemplars. The training process involves iteratively modifying one or more convolution layers of the low-resolution stylization subnet 314 such that the low-resolution stylization subnet 314 is capable of transferring these types of style features to input image data. At block 406, the low-resolution stylization subnet 314 applies a first style feature (i.e., one of the learned types of style features) from a low-resolution version of the style exemplar 320 to the first image data. More detailed examples of training a low-resolution stylization subnet are described herein with respect to FIGS. 4-7.

At block 408, the process 400 involves providing second image data obtained from the intermediate image to the high-resolution stylization subnet. One or more processing devices execute the image manipulation application 210 or other program code to implement block 408. For instance, a module of the multimodal style-transfer algorithm includes one or more operations corresponding to the high-resolution stylization subnet 316. The processing device implements block 408 by providing second image data as an input to this module, where the second image data is obtained from an output of the low-resolution stylization subnet 314 or another subnet of the multimodal style-transfer network. In some embodiments, the image manipulation application 210 obtains the second image data by creating an upsampled version of an intermediate image that is outputted by the low-resolution stylization subnet 314 or another subnet of the multimodal style-transfer network. For instance, an intermediate image having a resolution of 256×256 may be upsampled to a resolution of 512×512 or an intermediate image having a resolution of 512×512 may be upsampled to a resolution of 1024×1024. The upsampled version is the input to the high-resolution stylization subnet 316.

At block 410, the process 400 involves using the high-resolution stylization subnet to generate a stylized output image by applying the second style feature from a high-resolution version of the style exemplar to the second image data. One or more processing devices execute the image manipulation application 210 or other program code to implement block 410. For instance, a module corresponding to the high-resolution stylization subnet 316 can perform one or more feature-extraction operations and one or more convolution operations. Examples of the feature-extraction operations include generating a feature map based on color information (e.g., RGB color data) in the second image data, generating a feature map based on luminance information in the second image data, or some combination thereof. Examples of the convolution operations include combining style data obtained from a high-resolution version of a style exemplar with feature data from a feature map of the second image data.

The style data used at block 410 includes the second style feature associated with the high-resolution stylization subnet 316. In a training process for the multimodal style-transfer network 312, the high-resolution stylization subnet 316 is trained to recognize certain types of style features using high-resolution style exemplars. The training process involves iteratively modifying one or more convolution layers of the high-resolution stylization subnet 316 such that the high-resolution stylization subnet 316 is capable of transferring these types of style features to input image data. At block 410, the high-resolution stylization subnet 316 applies a second style feature (i.e., one of the learned types of style features) from a high-resolution version of the style exemplar 320 to the second image data. More detailed examples of training a high-resolution stylization subnet are described herein with respect to FIGS. 4-7.

At block 412, the process 400 involves outputting the stylized output image. The image manipulation application 210, as executed by one or more suitable processing devices, performs one or more operations suitable for implementing block 412. In some embodiments, these output operations include configuring a display device to render a graphical interface that includes the stylized output image and causing a display device to display the graphical interface with the stylized output image. Causing a display device to display the graphical interface may involve transmitting suitable commands between the processing device and the display device via a local data bus, transmitting suitable commands between the processing device and the display device via one or more data networks 202, etc. In additional or alternative embodiments, these output operations transmitting the stylized output image from a first computing system, such as a creating apparatus that executes the image manipulation application 210, to a second computing system, such as a user device 201, via one or more data networks 202.

Figure 5:
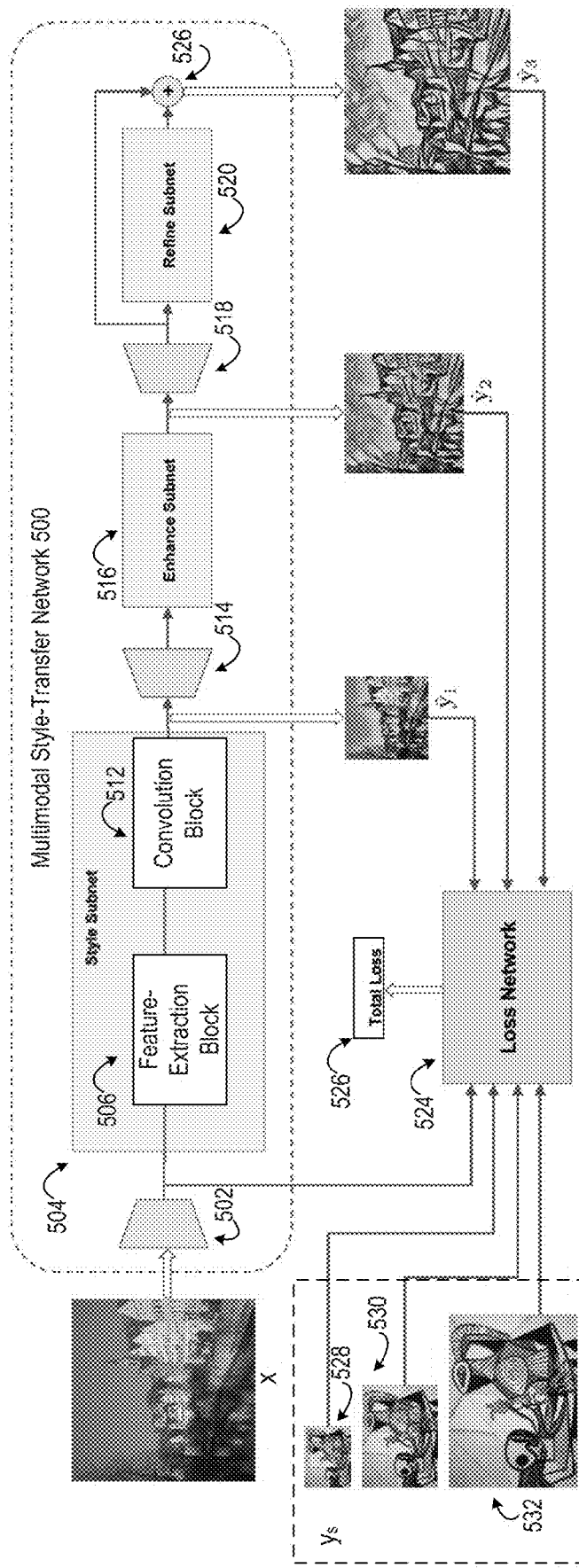
FIG. 5 depicts an example of training a multimodal style-transfer network to transform input images into stylized output images, according to certain embodiments of the present disclosure.

FIG. 5 depicts an example of training a multimodal style-transfer network 500 to transform input images into stylized output images. For instance, a trained multimodal style-transfer network 312 is outputted by the training process depicted in FIG. 5. The style-transfer training module 206 trains the multimodal style-transfer network 500, which is a feed-forward multimodal network, using a loss network 524, input training images x, and training exemplar sets y. For illustrative purposes, FIG. 5 depicts a two-level hierarchy involving three subnetworks. But other implementations involving any number of subnetworks may be used (e.g., by recursively extending the depicted concept to enable stylization of images high progressively greater resolutions).

In the example depicted in FIG. 5, the multimodal style-transfer network 500 is a hierarchical, deep-residual convolutional neural network. The multimodal style-transfer network 500 includes a style subnet 504 having parameter set $\Theta_1$, an enhance subnet 516 having a parameter set $\Theta_2$, and a refine subnet 520 having a parameter set $\Theta_3$. Each parameter set includes, for example, various weights that are applied when computing various losses $\Theta$ in the training process, as described in detail with respect to FIG. 7.

The subnets depicted in FIG. 5 are examples of the low-resolution stylization subnet 314 and the high-resolution stylization subnet 316 depicted in FIG. 3. For example, the style subnet 504 can be considered a "low-resolution-based" stylization subnet with respect to the enhance subnet 516 and the refine subnet 520, either of which can be considered a "high-resolution" stylization subnet with respect to the style subnet 504. Likewise, the enhance subnet 516 can be considered a "low-resolution-based" stylization subnet with respect to the refine subnet 520, which can in turn be considered a "high-resolution" stylization subnet with respect to the enhance subnet 516.

The multimodal style-transfer network 500 receives a training input image x as an input and applies, to the input image x, various more style features from a style exemplar $y_s$, which can have multiple versions (e.g., a low-resolution version 528, an intermediate-resolution version 530, and a high-resolution version 530). For example, in a given iteration of a training process, the style-transfer training module 206 trains the multimodal style-transfer network 500 to generate multiple output images $\hat{y}_k$ of increasing resolutions, as indicated by the following equation.

$$\hat{y}_k = f(\cup_{i=1}^{k} \Theta_i, x). \quad (1)$$

As represented by equation (1), a particular output image $\hat{y}_k$ is generated by the combined operations of stylization subnets 1 ... k having respective parameter sets $\Theta_1 ... \Theta_k$.

The style-transfer training module 206 provides the set of output images $\hat{y}_k$ as inputs to the loss network 524. The style-transfer training module 206 computes, via the loss network 524, a respective individual stylization loss for each of the output images $\hat{y}_k$. The style-transfer training module 206 also computes, via the loss network 418 a total loss 526 as a weighted combination of the individual stylization losses. An example of the loss network 524 is described in detail with respect to FIG. 7.

The hierarchical architecture of the multimodal style-transfer network 500 allows different subnets to be trained with different resolutions of one or more style exemplars. This hierarchical training allows the multimodal style-transfer network 500 to learn different levels of textural cues in artwork or other style exemplars. When a trained multimodal style-transfer network is applied in a live environment, the hierarchical design enables an input image to be stylized using different levels of a style obtained from different resolutions of a style exemplar. Because the subnets are combined into a common trained multimodal style-transfer network and trained hierarchically, the latter subnets (e.g., the refine subnet 520) enhance and refine the results from previous ones (e.g., the style subnet 504).

In some embodiments, the hierarchical architecture of the multimodal style-transfer network improves upon existing style-transfer networks. For instance, existing style-transfer networks are training at one resolution, which limits the range of style details that are learned by these style-transfer networks. A system that employs these existing networks must favor certain types of style details (e.g., coarse textures versus fine brushwork in artwork) by using a single resolution of style exemplars, where the single resolution is more effective for learning certain types of details (e.g., coarse textures) to the exclusion of others (e.g., fine brushwork).

By contrast, in the example depicted in FIG. 5, the multimodal style-transfer network 500 hierarchically stylizes the input image. In this hierarchical stylization, the style-transfer training module 206 resizes the input image x into a low-resolution image (e.g., from 1024×1024 to 256×256) via a bilinear downsampling layer 502. The style-transfer training module 206 stylizes the low-resolution image with the style subnet 504. For instance, the style subnet 504 may apply larger color and texture traits of a style exemplar $y_s$ to the low-resolution image. The style subnet 504 outputs a first-level stylized output image $\hat{y}_1$.

Figure 6:
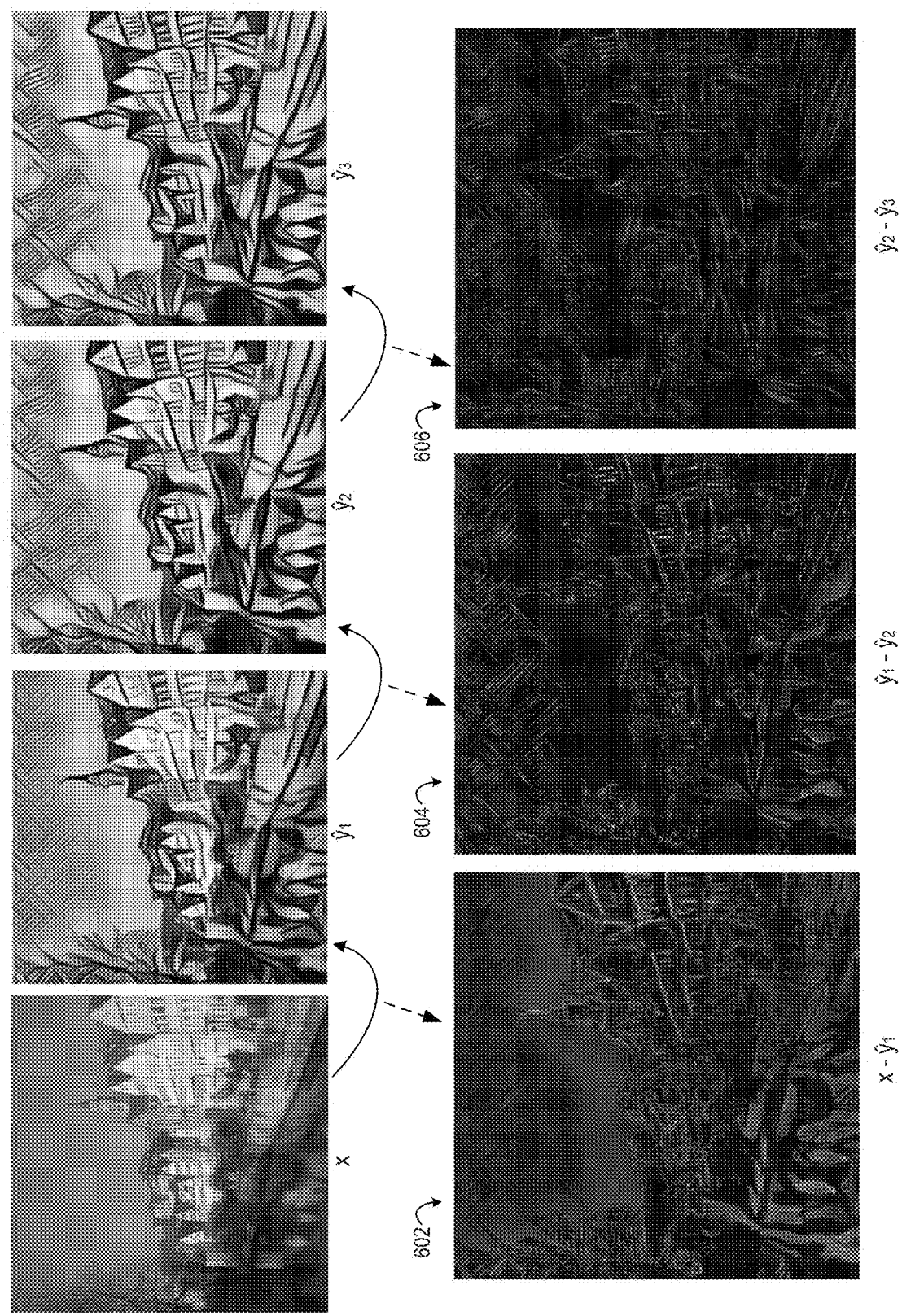
FIG. 6 depicts examples of the results of the multimodal stylization process from FIG. 5, according to certain embodiments of the present disclosure.

FIG. 6 depicts examples of the results of the hierarchical styling process of FIG. 5. As depicted in FIG. 6, the input image x is transformed into the first-level stylized output image $\hat{y}_1$. The absolute difference 602 (i.e., x−$\hat{y}_1$) between the input image x and the first-level stylized output image $\hat{y}_1$ indicates extensive differences in the color and texture of the semantic content that result from transforming the input image x with the style subnet 504. For instance, the coloring of the sky in the upper portion of the input image x has been changed, the appearance of the sky has been modified from a smooth appearance to a textured appearance, etc. These changes from the input image x to the first-level stylized output image $\hat{y}_1$ involve adding some of the large-scale stylistic patterns from the style exemplar to the semantic content of the input image x (e.g., giving the semantic content a "painted" appearance similar to the style exemplar, with certain textural details of the style exemplar omitted).

Returning to FIG. 5, the style-transfer training module 206 applies the second level of stylization by using the first-level stylized output image $\hat{y}_1$ to derive or otherwise obtain an input to the enhance subnet 516. For instance, the style-transfer training module 206 stylizes the first-level stylized output image $\hat{y}_1$ (or an interim input image derived from the first-level stylized output image $\hat{y}_1$) with the enhance subnet 516. This stylization adds more detailed style features to the first-level stylized output image $\hat{y}_1$ that may not have been applied to the input image x by the style subnet 504. The enhance subnet 516 outputs a second-level stylized output image $\hat{y}_2$.

In some embodiments, the style-transfer training module 206 resizes the first-level stylized output image $\hat{y}_1$ into an intermediate-resolution image (e.g., from 256×256 to 512×512) via an upsampling layer 514. In these embodiments, the upsampling layer 514 is used in both the training process performed by the style-transfer training module 206 and in a "live" environment in which the image manipulation application 210 applies a trained version of the multimodal style-transfer network 500. In other embodiments, the style-transfer training module 206 provides the first-level stylized output image $\hat{y}_1$ directly to the enhance subnet 516 without upsampling the first-level stylized output image $\hat{y}_1$. In these embodiments, the upsampling layer 514 is used in a "live" environment in which the image manipulation application 210 applies a trained version of the multimodal style-transfer network 500, but not the training process performed by the style-transfer training module 206. For instance, the style-transfer training module 206 can determine that the multimodal style-transfer network 500 is being used in a "training mode" and can omit upsampling operations represented by the upsampling layer 514 in FIG. 5. Doing so may reduce the memory requirements for the training process, and thereby increase the speed with which the multimodal style-transfer network is trained.

FIG. 6 depicts an example of changes between the first-level stylized output image $\hat{y}_1$ and the second-level stylized output image $\hat{y}_2$ that result from the transformation by the enhance subnet 516. Applying the enhance subnet 516 following the style subnet 504 can avoid obscuring the semantic content originally obtained from the input image x. The absolute difference 604 between these images (i.e., $\hat{y}_1$−$\hat{y}_2$) indicates that the enhance subnet 516 adds further textural detail to the semantic content. For instance, additional changes to the coloring of the sky have been made, although a comparison of the differences 602 and 604 show that these coloring changes are not as drastic as the changes applied by the style subnet 504. Likewise, the appearance of the sky has been modified to include a more textured appearance in the second-level stylized output image $\hat{y}_2$ as compared to the first-level stylized output image $\hat{y}_1$.

Returning to FIG. 5, the style-transfer training module 206 applies the third level of stylization by using the second-level stylized output image $\hat{y}_2$ to derive or otherwise obtain an input to the refine subnet 520. The style-transfer training module 206 stylizes the second-level stylized output image $\hat{y}_2$ (or another intermediate image derived from the second-level stylized output image $\hat{y}_2$) with the refine subnet 520. The refine subnet 520 further enhances style features that may not have been applied by the enhance subnet 516. For example, the refine subnet 520 may remove local pixelization artifacts that were introduced by the enhance subnet 516, the style subnet 504, or both. The refine subnet 520 outputs a third-level stylized output image $\hat{y}_3$. In this example, the third-level stylized output image $\hat{y}_3$ is the highest-resolution and most visually appealing output image obtained from the three levels of stylization.

In some embodiments, the style-transfer training module 206 resizes the second-level stylized output image $\hat{y}_2$ into an intermediate-resolution image (e.g., from 512×512 to 1024×1024) via an upsampling layer 518. In these embodiments, the upsampling layer 518 is used in both the training process performed by the style-transfer training module 206 and in a "live" environment in which the image manipulation application 210 applies a trained version of the multimodal style-transfer network 500. In other embodiments, the style-transfer training module 206 provides the second-level stylized output image $\hat{y}_2$ directly to the refine subnet 22 without upsampling the second-level stylized output image $\hat{y}_2$. In these embodiments, the upsampling layer 518 is used in a "live" environment in which the image manipulation application 210 applies a trained version of the multimodal style-transfer network 500, but not the training process performed by the style-transfer training module 206. For instance, the style-transfer training module 206 can determine that the multimodal style-transfer network 500 is being used in a "training mode" and can omit upsampling operations represented by the upsampling layer 518 in FIG. 5. Doing so may reduce the memory requirements for the training process, and thereby increase the speed with which the multimodal style-transfer network is trained.

FIG. 6 depicts an example of changes between the second-level stylized output image $\hat{y}_2$ and the third-level stylized output image $\hat{y}_3$ that result from the transformation by the refine subnet 520. The absolute difference 606 between these images (i.e., $\hat{y}_2-\hat{y}_3$) indicates that the refine subnet 520 adds more detail with respect to the texture-based style features.

In the training process, the style-transfer training module 206 performs multiple iterations of the process depicted in FIG. 5. In some embodiments, each iteration involves using a different training input image x as the input of the multimodal style-transfer network 500. The loss network 524 extracts features from both the style exemplar $y_s$ and the stylized results $\hat{y}_1, \hat{y}_2 \ldots \hat{y}_k$. The style-transfer training module 206 computes a total loss 526 to determine the extent to which the style of the style exemplar $y_s$ matches the style of the stylized results $\hat{y}_1, \hat{y}_2 \ldots \hat{y}_k$. The style-transfer training module 206 updates one or more parameters of the multimodal transfer network 500 based on the total loss 526. For example, various node weights of neural network nodes in various subnets may be adjusted. In some embodiments, using a diverse set of non-duplicated images for training avoids negative transfer.

The feature-extraction block 506 computes one or more feature maps (e.g., a color-based feature map, a luminance-based feature map, etc.). A convolution block 512 performs one or more convolution operations using one or more feature maps generated by the feature-extraction block 506. For example, the convolution block 512 applies one or more convolution operations to the feature map and style data from the low-resolution version 528 of the style exemplar $y_s$. (In some embodiments, corresponding operations are performed for the intermediate-resolution version 530 of the style exemplar $y_s$ in the enhance subnet 516 and the intermediate-resolution version 530 of the style exemplar $y_s$ in the refine subnet 520.) The convolution operations transform the input image into a stylized output image using the style exemplar.

For simplicity of illustration, FIG. 5 only depicts the feature-extraction block and the convolution block for the style subnet 504. But each subnet in the multimodal style-transfer network 500 can include a feature-extraction block and a convolution block. These blocks can operate together in each subnet in a manner similar to that described above with respect to the style subnet 504 (e.g., learning color-based or luminance-based features of the first-level stylized output image $\hat{y}_1$ and convolving the result feature map with the appropriate style exemplar).

A feature-extraction block can be implemented in any suitable manner. In one example, a feature-extraction block 506 includes three sequentially arranged convolutional layers (e.g., a 9×9 layer followed by a first 3×3 layer, which is followed by a second 3×3 layer). The latter two layers are used for downsampling. This example of a feature-extraction block 506 can also include three residual blocks. An example of a convolution block 512 can include three residual blocks, i.e., two resize-convolution layers for upsampling and a 3×3 convolutional layer that outputs an RGB image $\hat{y}$. In these examples, non-residual convolutional layers can be followed by instance normalization and rectified linear unit nonlinearity. In some embodiments involving these types of examples, a nearest-neighbor interpolation upsampling layer and a resize-convolution layer are used instead of deconvolutions to avoid checkerboard artifacts in the generated images $\hat{y}$.

In some embodiments, the blocks of the enhance subnet 516 (e.g., one or more of a feature-extraction block and a convolution block) are structured similarly to the blocks of the style subnet 504, but with different numbers of downsampling layers, upsampling layers, or both. For instance, with respect to the example described above for the style subnet 504, the enhance subnet 516 may have an additional convolutional layer for downsampling and an additional resize-convolution layer for upsampling. These additional layers enlarge the receptive field sizes. Enlarging the receptive field sizes facilitates receiving a higher-resolution image as an input to the enhance subnet 516 (e.g., a 512-size image instead of a 256-size image).

In some embodiments, the blocks of the refine subnet 520 (e.g., one or more of a feature-extraction block and a convolution block) are structured similarly to the blocks of the style subnet 504, but with different numbers of downsampling layers, upsampling layers, or both. For instance, using the example described above for the style subnet 504, the refine subnet 520 includes a sequence of three convolutional layers, three residual blocks, two resize-convolution layers and another convolutional layer to obtain the output image $\hat{y}_3$ (e.g., a "final" output image). This refine subnet 520 may have fewer layers (i.e., be "shallower") as compared to the style and enhance subnets. Latter subnets (i.e., subnets further along in a feed-forward direction within the sequence of subnets) can be shallower because, for example, subnets positioned earlier in the sequence can contribute to the learning tasks of subnets positioned later in the sequence. In some embodiments, using a shallower refine subnet reduces memory and computational complexity, which can facilitate processing of higher-resolution images (e.g., a 1024-size image).

In some embodiments, the refine subnet 520 also includes an identity connection 522 between the input and output of the refine subnet 520. The identity connection 522 allows the difference between the input and output of the refine subnet 520 to be learned for network-adjustment purposes. For example, in the absence of the identity connection, the refine subnet 520 can be represented by the function $\hat{y}_3=f(x_3)$, where $x_3$ is the input image provided to the refine subnet. But, given the subtle and detailed differences between the input image $x_3$ and the output image $\hat{y}_3$, a refine subnet 520 that is trained on function $f$ may generate less desirable results (e.g., a less effective style transfer) when applied to live input images. By contrast, when using the identity connection 522, the refine subnet 520 can be represented by the function $\hat{y}_3=x_3+h(x_3)$. Training the refine subnet 520 to learn function h, which represents the difference between the input image $x_3$ and the output image $\hat{y}_3$, allows the refine subnet 520 to perform more effective style transfers on input images.

Figure 7:
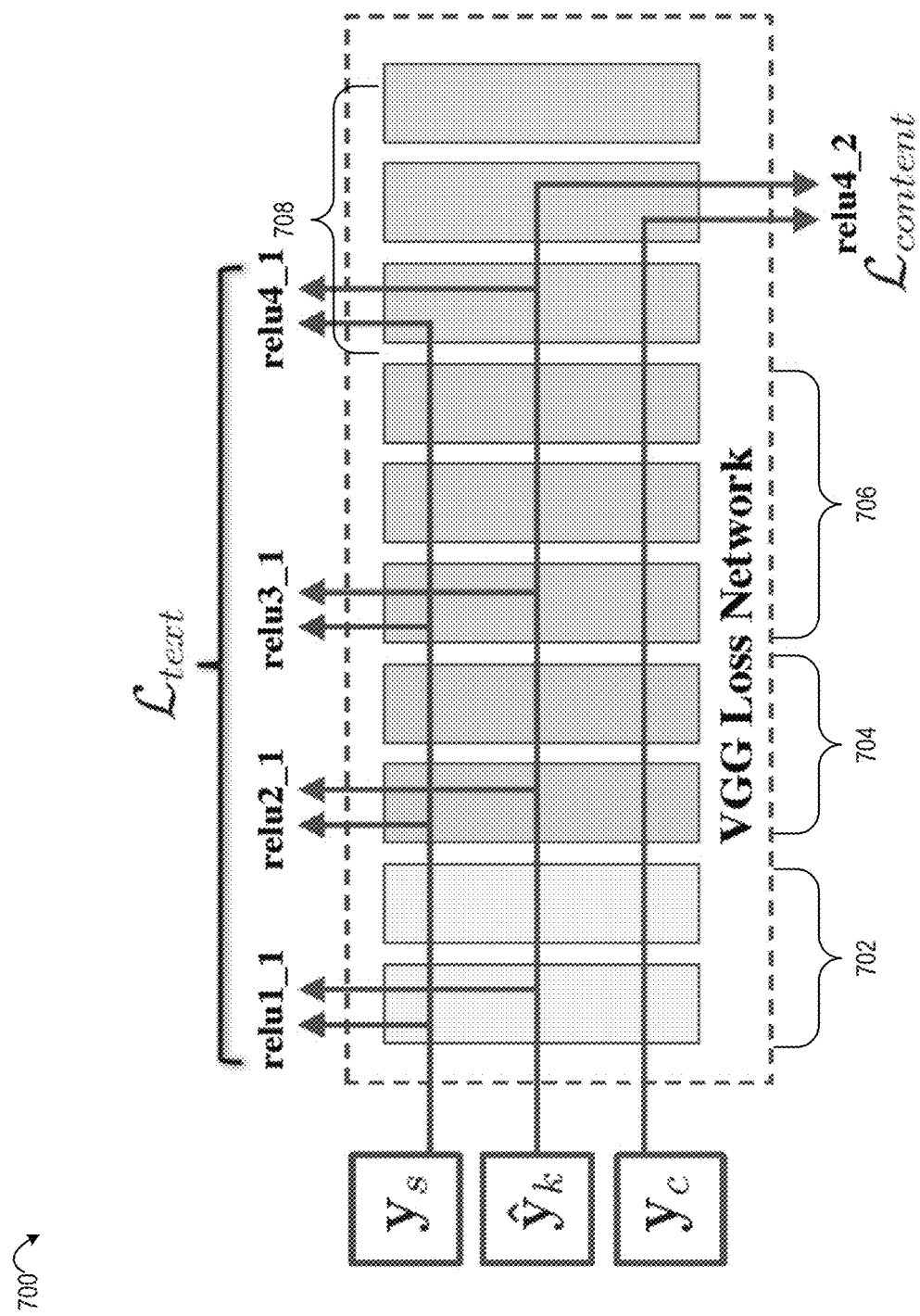
FIG. 7 depicts an example of a loss network that is used to train the multimodal style-transfer network from FIG. 5, according to certain embodiments of the present disclosure.

FIG. 7 depicts an example of a loss network 700, which can be an implementation of the loss network 524 that is used by the style-transfer training module 206 to train the multimodal style-transfer network 500. The style-transfer training module 206 uses the loss network 524 to identify two different perceptual losses, which are defined to measure the extent to which a generated image $\hat{y}_k$ combines the texture and style cues of the style target $y_s$ with the semantic content of the content target $y_c$ (e.g., an input image x provided to the style subnet 504, a first-level stylized output image $\hat{y}_1$ provided to the enhance subnet 516, etc.).

In the example depicted in FIG. 7, the loss network 700 is a VGG network. The loss network 700 includes ten convolutional layers, each of which is followed by a ReLU activation. The loss network 700 includes a first layer set 702, a second layer set 704, a third layer set 706, and a fourth layer set 708. The layer set 704 includes layers relu1_1 and relu1_2. The layer set 702 includes layers relu2_1 and relu2_2. The layer set 706 includes layers relu3_1, relu3_2, and relu3_3. The layer set 708 includes layers relu4_1, relu4_2, and relu4_3. Each layer set includes a respective max pooling layer.

The first perceptual loss is a content loss, which indicates a degree of dissimilarity between an output image $\hat{y}_k$ and a content target $y_c$ (e.g., a difference in semantic content between input image data and stylized output image data). The style-transfer training module 206 computes the content loss from a content loss function. In some embodiments, the content loss function computes a squared-error loss $L_{content}$ ($\hat{y}_k$, $y_c$, l) between feature representations of an output image $\hat{y}_k$ and a content target $y_c$ at a layer l of the loss network 524. The content loss directly compares the feature maps computed from the corresponding layers and thereby characterizes spatial content similarity (i.e., similarity in the semantic content between an output image $\hat{y}_k$ and a content target $y_c$). An example of a content loss function is the following equation:

$$L_{content}(\hat{y}_k, y_c, l) = \sum_{i=1}^{N_l} \|F_i^l(\hat{y}_k) - F_i^l(y_c)\|_2^2. \quad (2)$$

In equation (2), the term $F_i^l(y)$ denotes the ith feature map in the lth layer of the loss network 524 that is applied to the image y. In a simplified example of the training process in which $N_l=1$, the style-transfer training module 206 computes the content loss based on the learned representations for an output image $\hat{y}_k$ and a content target $y_c$ at layer relu4_2 in the loss network 700. These learned representations are provided as inputs $F_i^l(\hat{y}_k)$ and $F_i^l(y_c)$ to the equation (2).

The second perceptual loss is a texture loss, which indicates a degree of stylistic similarity between two images. Stylistic similarity is to a similarity between a first image style in a first image and a second image style in a second image. For example, vectors representing color or contrast information can be calculated for two images. The stylistic similarity can be determined by calculating a metric based on these vectors. A larger calculated distance indicates a lower degree of stylistic similarity, and a smaller calculated distance indicates a higher degree of stylistic similarity.

For instance, the texture loss can be a degree of dissimilarity between texture representations of an output image $\hat{y}_k$ and a style exemplar $y_s$ (e.g., a difference in texture between a style exemplar and stylized output image data). Texture representations discard the spatial information but retain the statistic profiles of color and intensity distribution of an input image. The multimodal style-transfer network can use correlations between feature maps in each layer of the loss network as texture representations of the input image.

These correlations are given by a Gram matrix $G_{ij}^l(y)$ at a layer l, whose elements are pairwise scalar products between feature maps i and j, as indicated in the following equation $$G_{ij}^l(x) = \langle F_i^l(x), F_j^l(x) \rangle. \quad (3)$$

Examples of using these correlations for texture representation are described in L. Gatys et al., "Texture synthesis using convolutional neural networks," *Advances in Neural Information Processing Systems*, pp. 262-270 (2015) and L. A. Gatys et al., "Image style transfer using convolutional neural networks," *Proceedings of the IEEE Conference on Computer Vision and Pattern Recognition*, pp. 2414-23 (2016), both of which are incorporated by reference herein.

To train the multimodal style-transfer network, a set of Gram matrices $G^l$, where l∈L, is used as a set of texture representations. In some embodiments, a texture loss function is used to compute a texture loss $L_{text}(\hat{y}_k, y_s)$ between an output image $\hat{y}_k$ and a style exemplar $y_s$. An example of a texture loss function is the following equation:

$$L_{text}(\hat{y}_k, y_s) = \sum_{l \in L} \|G^l(\hat{y}_k) - G^l(y_s)\|_2^2. \quad (4)$$

In a simplified example involving one Gram matrix for $\hat{y}_k$ and one Gram matrix for $y_s$, the style-transfer training module 206 computes the texture loss by extracting the learned representations for the output image $\hat{y}_k$ and the style exemplar $y_s$ at four layers of the loss network 700 (e.g., relu1_1, relu2_1, relu3_1 and relu4_1).

The style-transfer training module 206 can compute a stylization loss $L_S$ from a weighted sum of the content loss and the texture loss. An example of a stylization loss function is:

$$L_S(\hat{y}_k, y_c, y_s) = \alpha L_{content}(\hat{y}_k, y_c) + \beta L_{text}(\hat{y}_k, y_s). \quad (5)$$

In equation (5), the term α is a content weight that is applied to the content loss, and the term β is a texture weight that is applied to the texture loss.

The relative values of the content weight and the texture weight can control the extent to which a given stylization subnet emphasizes the preservation of semantic content or the enhancement of stylization. For example, a low-resolution stylization subnet, such as the style subnet 504, can have a content weight that is greater than a texture weight. Such a configuration is depicted in FIG. 5, where the difference 602 indicates that the style subnet 504 performs a texture mapping that preserves semantic content of the input image x (i.e., the building, the water, and sky depicted in the input image) while transferring fewer of the style features of the style exemplar. Continuing with this example, a high-resolution stylization subnet, such as the enhance subnet 516, can have a texture weight that is greater than a content weight. Such a configuration is also depicted in FIG. 5, where the difference 604 indicates that the enhance subnet 516 further enhances the stylization.

The style-transfer training module 206 computes a total loss 526 from k stylization losses of the k output images of different resolutions generated by the multimodal style-transfer network. (In the example depicted in FIG. 5, k=3.) The kth stylization loss is computed from the following equation:

$$L_S^k(\hat{y}_k, y_c^k, y_s^k) = \alpha L_{content}(\hat{y}_k, y_c^k) + \beta L_{text}(\hat{y}_k, y_s^k). \quad (6)$$

In equation (6), where $y_c^k$ and $y_s^k$ are the corresponding content target and style exemplar for the kth subnet that generates the output image $\hat{y}_k$.

Since such stylization losses are computed based on the outputs of different subnets of the multi-modal style-transfer network, a total loss (e.g., a weighted combination of all stylization losses) may not be useful for directly back-propagating and updating node weights through the neural network nodes of the multimodal style-transfer network. To address this issue, the style-transfer training module 206 uses different stylization losses to back-propagate weights for different ranges of layers.

These different stylization losses are computed using a hierarchical stylization loss function $L_H$. A hierarchical stylization loss is a weighted sum of such stylization losses from a set of stylization subnets. An example of a hierarchical stylization loss function is:

$$L_{content}(\hat{y}_k, y_c, l) = \sum_{i=1}^{N_l} \|F_i^l(\hat{y}_k) - F_i^l(y_c)\|_2^2. \qquad (7)$$

In equation (7), the term $\lambda_k$ is the hierarchical weight applied to the stylization loss $L_s^k$.

The training process involves input training images x from a training image set X. In the training process, the style-transfer training module 206 computes, for each subnet and at each iteration of the training process, a hierarchical stylization loss from a respective weighted combination of stylization losses for a set of subsequent subnets following the subnet under consideration. The multimodal style-transfer network is optimized using these hierarchical stylization losses. For example, the kth stylization subnet, which is denoted by $\Theta_k$ in equation (7), is trained to minimize the parallel weighted stylization losses that are computed from the latter outputs $\hat{y}_i (i \geq k)$ generated by the stylization subnets i that are further along in a feed-forward direction within the sequence of subnets. An example of a minimization function for performing this optimization is:

$$\Theta_k = \underset{\Theta_k}{\mathrm{argmin}} E_{x \sim X} \left[ \sum_{i \geq k}^{K} \lambda_1 L_s^k \left( f \left( \bigcup_{j=1}^{k} \Theta_j, x \right) \right), y_c^i, y_s^i \right]. \qquad (8)$$

As indicated in equation (8), the various subnets, which are designed for different purposes, are not totally independent from one another. Former subnets contribute to minimize losses of latter subnets. Thus, shallower convolutional neural network structure can be used for latter subnets. In some embodiments, these shallower architectures, which are enabled by the sequential structure of the multimodal style-transfer network, reduce one or more of the memory requirements for the training process and the run time for the training process.

In some embodiments, a general back-propagation function is denoted by $f^{-1}$. For a given iteration, the weight updates (i.e., gradients) of the subnet $\Theta_k$ can be written as follows:

$$\Delta \Theta_k = \begin{cases} f^{-1}(\lambda_k L_s^k) & k = K \\ f^{-1}(\lambda_k L_s^k, \Delta \Theta_{k+1}) & 1 \leq k < K \end{cases}. \qquad (9)$$

In equation (9), the weights of the current subnet $\Theta_k$ are influenced by both the stylization loss at the current level $L_s^k$ a and the gradients of the latter subnets (i.e., subnets $\Theta_{k+1}$).

Example of a Computing System for Using a Multimodal Style-Transfer Network

Figure 8:
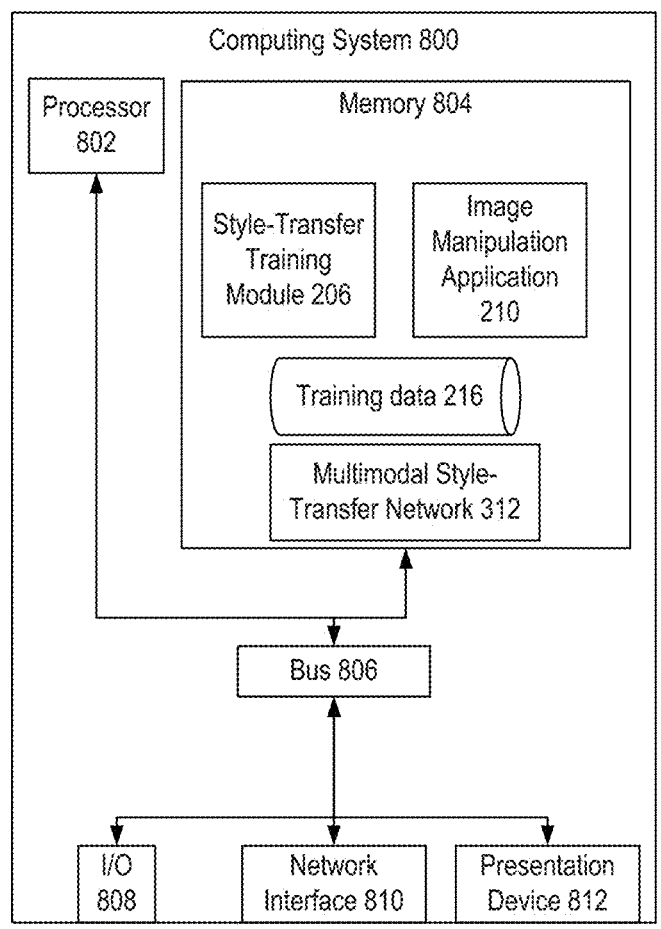
FIG. 8 depicts an example of a computing system that applies style features from multi-resolution style exemplars to input images, according to certain embodiments of the present disclosure.

Any suitable computing system or group of computing systems can be used for performing the operations described herein. For example, FIG. 8 depicts examples of computing system 800 that executes a style-transfer training module 206. In some embodiments, the computing system 800 also executes the image manipulation application 210, as depicted in FIG. 8. In other embodiments, a separate computing system having devices similar to those depicted in FIG. 8 (e.g., a processor, a memory, etc.) executes the image manipulation application 210.

The depicted examples of a computing system 800 includes a processor 802 communicatively coupled to one or more memory devices 804. The processor 802 executes computer-executable program code stored in a memory device 804, accesses information stored in the memory device 804, or both. Examples of the processor 802 include a microprocessor, an application-specific integrated circuit ("ASIC"), a field-programmable gate array ("FPGA"), or any other suitable processing device. The processor 802 can include any number of processing devices, including a single processing device.

The memory device 804 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 800 may also include a number of external or internal devices, such as input or output devices. For example, the computing system 800 is shown with one or more input/output ("I/O") interfaces 808. An I/O interface 808 can receive input from input devices or provide output to output devices. One or more buses 806 are also included in the computing system 800. The bus 806 communicatively couples one or more components of a respective one of the computing system 800.

The computing system 800 executes program code that configures the processor 802 to perform one or more of the operations described herein. The program code includes, for example, the style-transfer training module 206, the image manipulation application 210, or other suitable applications that perform one or more operations described herein. The program code may be resident in the memory device 804 or any suitable computer-readable medium and may be executed by the processor 802 or any other suitable processor. In some embodiments, both the style-transfer training module 206 and the image manipulation application 210 are stored in the memory device 804, as depicted in FIG. 8. In additional or alternative embodiments, one or more of the style-transfer training module 206 and the image manipulation application 210 are stored in different memory devices of different computing systems. In additional or alternative embodiments, the program code described above is stored in one or more other memory devices accessible via a data network.

The computing system 800 can access one or more of the training data 216 and the multimodal style-transfer network 312 in any suitable manner. In some embodiments, some or all of one or more of these data sets, models, and functions are stored in the memory device 804, as in the example depicted in FIG. 8. For example, a computing system 800 that executes the style-transfer training module 206 can provide access to the multimodal style-transfer network 312 by external systems that execute the image manipulation application 210.

In additional or alternative embodiments, one or more of these data sets, models, and functions are stored in the same memory device (e.g., one of the memory device 804). For example, a common computing system, such as the creative apparatus 104 depicted in FIG. 1, can host the style-transfer training module 206 and the image manipulation application 210 as well as the multimodal style-transfer network 312. In additional or alternative embodiments, one or more of the programs, data sets, models, and functions described herein are stored in one or more other memory devices accessible via a data network.

The computing system 800 also includes a network interface device 810. The network interface device 810 includes any device or group of devices suitable for establishing a wired or wireless data connection to one or more data networks. Non-limiting examples of the network interface device 810 include an Ethernet network adapter, a modem, and/or the like. The computing system 800 is able to communicate with one or more other computing devices (e.g., a computing device executing an image manipulation application 210) via a data network using the network interface device 810.

In some embodiments, the computing system 800 also includes the presentation device 812 depicted in FIG. 8. A presentation device 812 can include any device or group of devices suitable for providing visual, auditory, or other suitable sensory output. Non-limiting examples of the presentation device 812 include a touchscreen, a monitor, a speaker, a separate mobile computing device, etc. In some aspects, the presentation device 812 can include a remote client-computing device that communicates with the computing system 800 using one or more data networks described herein. Other aspects can omit the presentation device 812.

Examples of Experimental Results

Figure 9:
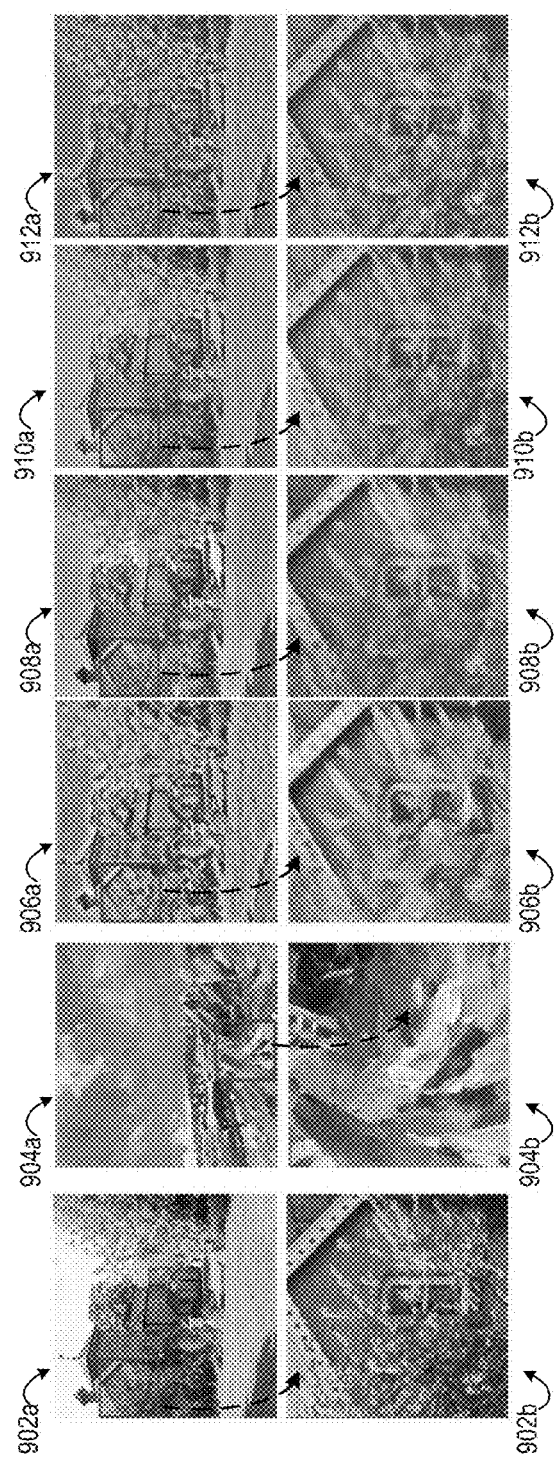
FIG. 9 depicts an example that compares results from multimodal style-transfer networks to results from existing singular transfer networks, according to certain embodiments of the present disclosure.
Figure 10:
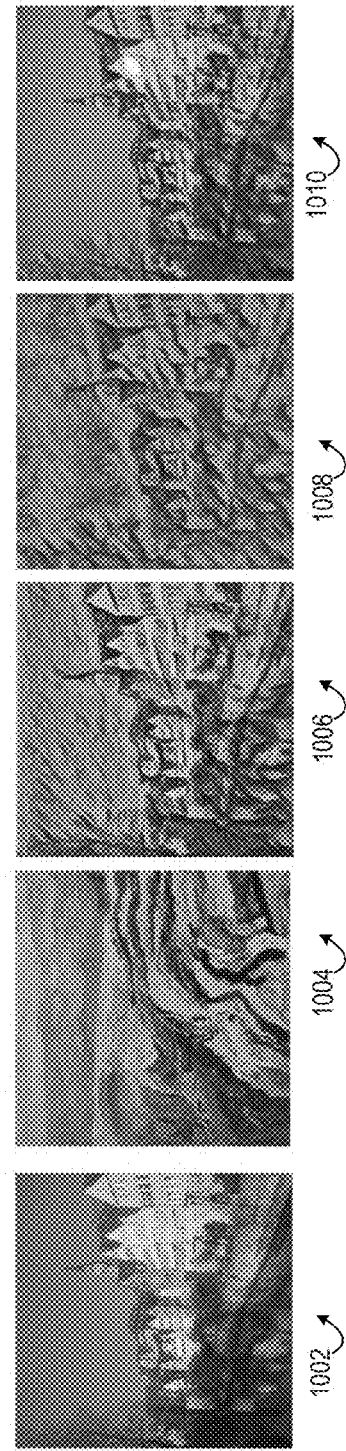
FIG. 10 depicts another example that compares results from multimodal style-transfer networks to results from existing singular transfer networks, according to certain embodiments of the present disclosure.
Figure 11:
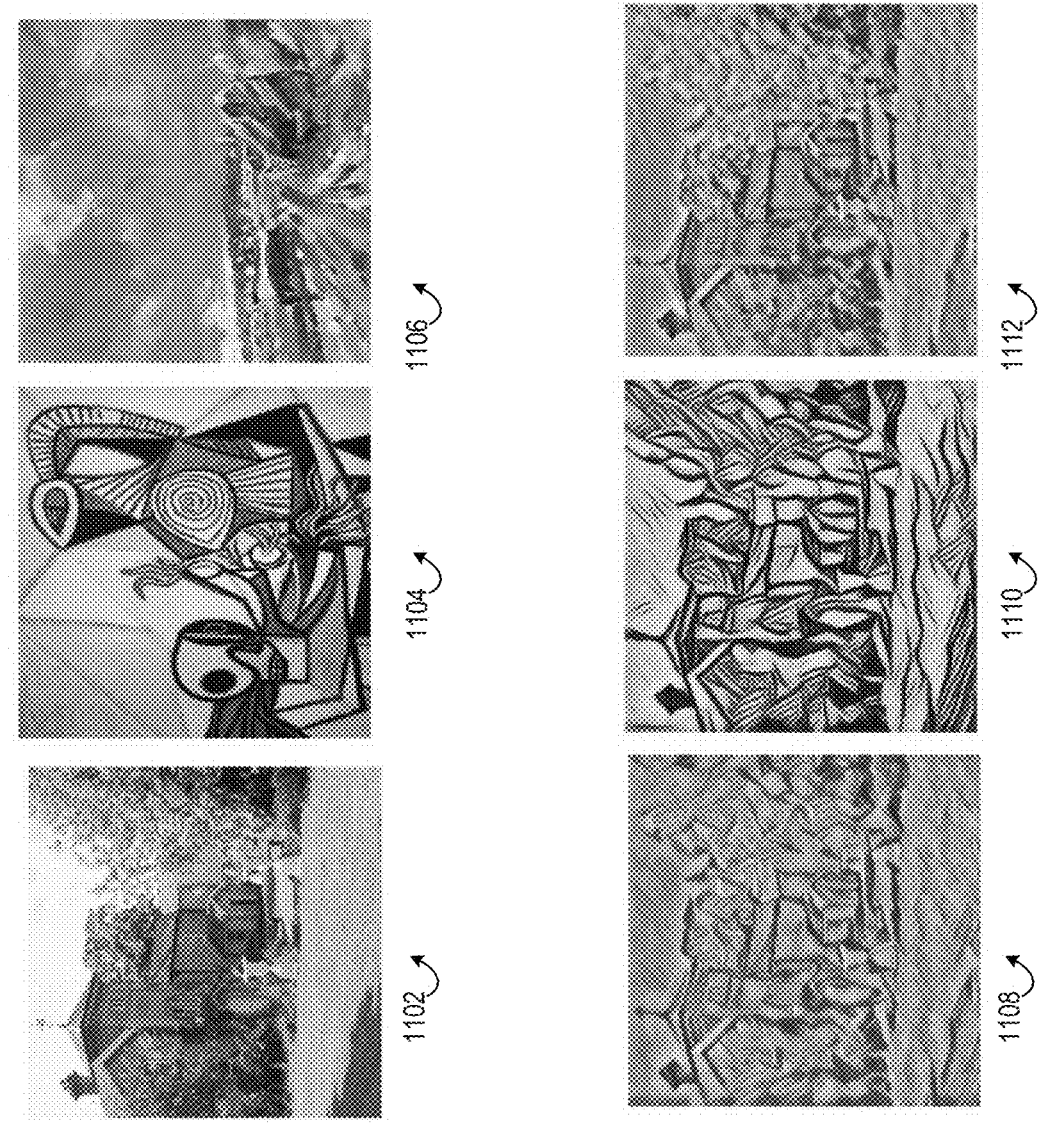
FIG. 11 depicts an example that compares results from a multimodal style-transfer network trained with multiple style exemplars to results from a multimodal style-transfer network trained with single-resolution style exemplars, according to certain embodiments of the present disclosure.

FIGS. 9-11 depict results from experiments involving certain embodiments of multimodal style transfer network described herein. In these examples, the multimodal style-transfer network was trained on a subset of 32,059 publicly available images having widths and heights greater than or equal to 480 pixels. The experiments involved cropping those images and resizing them to 512×512. Style-transfer models were trained for 10,000 iterations with batch size 1. The learning rate was initially set as 1×10-3, and then reduced by a factor of 0.8 every 2,000 iterations. Content losses were computed at layer relu4_2 of a VGG-19 loss network, and texture losses were computed at layers relu1_1, relu2_1, relu3_1 and relu4_1 of the VGG-19 loss network for all subnets. The content weights were all set to 1. The texture weights were selected depending on different styles, as a universal ratio of texture to content did not fit all artistic styles. The weights of stylization losses were set as $\lambda_1:\lambda_2:\lambda_3=1:0.5:0.25$. The parameters of former subnets were updated to incorporate the current and latter stylization losses. The latter losses had smaller weights in order to avoid totally dominating the optimization process of the former subnets.

In these experiments, multimodal transfer results, as compared with singular transfer results, were visually more similar to the original artistic styles both in coarse texture structure and fine brushwork. Singular style transfers with style exemplars of size 256 caused a mismatch in texture scales, in which the texture scale was much smaller in the output stylized images than that in the style exemplar. Furthermore, singular transfer with style exemplars of size 1024 failed to learn distortion and fine brushwork.

FIG. 9 depicts an example that compares results from multimodal style-transfer networks described herein with existing singular transfer networks. The input image 902a, with magnified image region 902a, is stylized using the style exemplar 904a, with magnified region 904b. Stylized output image 906a, with magnified region 906b, is generated with a multimodal style-transfer network. Stylized output images 908a, 910a, 912a (with respective magnified regions 908b, 910b, 912b) are generated with various singular transfer networks. FIG. 9 shows that multimodal transfer can learn different levels of textures (e.g., style, color, large texture distortion, and fine brushwork) more accurately than singular transfer networks. As depicts in FIG. 9, all stylized output images are repainted with the color of the style exemplar 904a. But the magnified regions show that the brush strokes are not captured well in the stylized output images 910a and 912a, and the magnified region of stylized output image 908b is blurry. By comparison, stylized output image 906a generated with a multimodal style-transfer algorithm reflects the brushwork of the original artwork on high-resolution images more closely than the other stylized output images.

FIG. 10 depicts another example that compares results from multimodal style-transfer networks described herein with existing singular transfer networks. In this example, an input image 1002 is stylized with a style exemplar 1004. The stylized output image 1006 is generated using a multimodal style-transfer network in accordance with certain embodiments described herein. The stylized output images 1008 and 1010 are generated with existing style-transfer networks. All style transfer networks were trained on images of size 256 using instance normalization and the same content-to-texture weights.

The stylized output image 1008 is visibly darker than the style exemplar 1004 in color, and the texture scale in the stylized output image 1010 does not match the texture scale of the style exemplar 1004. By contrast, the stylized output image 1006 generated with a multimodal style-transfer network has brightness and texture that is comparable to the style exemplar 1004.

In some embodiments, a multimodal style-transfer network can be trained with multiple styles such that a final stylized output images fuses the semantic content of an input image, the coarse texture distortion of one style exemplar, and the fine brushwork of another style exemplar. FIG. 11 depicts an example of results obtained with a multimodal style-transfer network that is trained with two different style exemplars. In this example, a multimodal style-transfer is performed on an input image 1102 using style exemplars 1104 and 1106, which are used to train a multimodal transport network. The stylized output image 1108 includes large texture distortion from the style exemplar 1104 and small, detailed brushwork from the style exemplar 1106. For comparison, the stylized output image 1110 is the result of a style-transfer operation using a model trained only on the style exemplar 1104, and the stylized output image 1112 is the result of a style-transfer operation using a model trained only on the style exemplar 1106.

In some embodiments, the multimodal style-transfer network provided improvements in one or more of processing speed and memory use as compared with existing singular transfer networks. In one experiment, although a multimodal style-transfer network was more than twice as deep as an existing Johnson Net singular transfer network, the speed and memory usage were close to those of Johnson Net (e.g., 0.54 seconds versus 0.42 seconds, 3100 MB versus 2400

MB) when generating high-resolution images, which benefited from the hierarchical transfer procedure where most computation was done on low resolutions. And another singular transfer network, DS Net, performed more poorly even with the same number of parameters. In these experiments, multimodal style-transfer networks were suitable for applications involving high image resolutions, because the multimodal style-transfer networks could generate results more similar to the desired artistic styles with a small cost in computing resources.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A method comprising:
accessing, from a memory device, an input image and a style exemplar;
transforming, by a processing device, the input image into a stylized output image by applying a first style feature and a second style feature from the style exemplar to the input image, wherein applying the first style feature and the second style feature comprises:
  providing the input image to a multimodal style-transfer network having a low-resolution-based stylization subnet and a high-resolution stylization subnet
  generating, by the low-resolution-based stylization subnet, an intermediate image by applying the first style feature from a low-resolution version of the style exemplar to first image data obtained from the input image, wherein the low-resolution-based stylization subnet is trained with low-resolution style exemplars to apply the first style feature,
  providing second image data obtained from the intermediate image to an input of the high-resolution stylization subnet, wherein the high-resolution stylization subnet is trained with high-resolution style exemplars to apply the second style feature, wherein the high-resolution stylization subnet comprises an identity connection from the input of the high-resolution stylization subnet to an output of the high-resolution stylization subnet, and
  generating, by the high-resolution stylization subnet, the stylized output image by applying the second style feature from a high-resolution version of the style exemplar to the second image data, wherein the stylized output image comprises a sum of (i) the second image data received at the input of the high-resolution stylization subnet via the identity connection and (ii) third image data generated by the high-resolution stylization subnet transforming the second image data; and
causing an output device to display the stylized output image.

2. The method of claim 1, further comprising:
obtaining, by the processing device, the first image data by downsampling the input image to a first resolution, wherein the low-resolution style exemplars have the first resolution and the intermediate image is generated with the first resolution; and
obtaining, by the processing device, the second image data by upsampling, to a second resolution, the intermediate image or an additional intermediate image having a higher resolution than the intermediate image, wherein the high-resolution style exemplars have the second resolution and the stylized output image is generated with the first resolution.

3. The method of claim 1, wherein the multimodal style-transfer network comprises a feed-forward neural network with subnets that include the low-resolution-based stylization subnet and the high-resolution stylization subnet, wherein the multimodal style-transfer network is trained by iteratively performing operations comprising:
computing stylization losses for the subnets, wherein a stylization loss for a subnet is computed from a combination of:

(i) a content loss weighted with a content weight, wherein the content loss indicates a difference in semantic content between the input image and an output of the subnet, and (ii) a texture loss weighted with a texture weight, wherein the texture loss indicates a difference in texture between the style exemplar and the output of the subnet; and adjusting the feed-forward neural network based on one or more of the stylization losses.

4. The method of claim 3, wherein adjusting the feed-forward neural network based on the stylization losses comprises:

computing, for each subnet and in each iteration, a respective hierarchical stylization loss for a respective set of subsequent subnets in the feed-forward neural network, wherein each hierarchical stylization loss is computed from a respective weighted combination of stylization losses for the respective set of subsequent subnets; and modifying the feed-forward neural network such that each hierarchical stylization loss is minimized, wherein the iteration ceases based on each hierarchical stylization loss being minimized.

5. The method of claim 4, wherein the low-resolution-based stylization subnet has a first content weight and a first texture weight that is less than the first content weight, wherein the high-resolution stylization subnet has a second content weight and a second texture weight that is greater than the first content weight.

6. The method of claim 3, wherein a stylization loss for the high-resolution stylization subnet is computed with respect to the stylized output image having the sum.

7. The method of claim 3, further comprising outputting the trained multimodal style-transfer network by storing the trained multimodal style-transfer network in an additional memory device accessible by an image manipulation application.

8. The method of claim 1, wherein the multimodal style-transfer network is a convolutional neural network having a first set of layers comprised in the low-resolution-based stylization subnet and a second set of layers comprised in the high-resolution stylization subnet, wherein the high-resolution stylization subnet receives one or more of (i) an output of the low-resolution-based stylization subnet and (ii) image data generated from the output of the low-resolution-based stylization subnet.

9. A system comprising:
a processing device; and
a non-transitory computer-readable medium communicatively coupled to the processing device, wherein the processing device is configured to execute program code stored in the non-transitory computer-readable medium and thereby perform operations comprising:
accessing an input image and a style exemplar;
transforming the input image into a stylized output image by applying a first style feature and a second style feature from the style exemplar to the input image,
wherein applying the first style feature and the second style feature comprises:
providing the input image to a multimodal style-transfer network having a low-resolution-based stylization subnet and a high-resolution stylization subnet,
generating, by the low-resolution-based stylization subnet, an intermediate image by applying the first style feature from a low-resolution version of the style exemplar to first image data obtained from the input image, wherein the low-resolution-based stylization subnet is trained with low-resolution style exemplars to apply the first style feature, providing second image data obtained from the intermediate image to an input of the high-resolution stylization subnet, wherein the high-resolution stylization subnet is trained with high-resolution style exemplars to apply the second style feature, wherein the high-resolution stylization subnet comprises an identity connection from the input of the high-resolution stylization subnet to an output of the high-resolution stylization subnet, and generating, by the high-resolution stylization subnet, the stylized output image by applying the second style feature from a high-resolution version of the style exemplar to the second image data, wherein the stylized output image comprises a sum of (i) the second image data received at the input of the high-resolution stylization subnet via the identity connection and (ii) third image data generated by the high-resolution stylization subnet transforming the second image data; and causing an output device to display the stylized output image.

10. The system of claim 9, the operations further comprising:

obtaining the first image data by downsampling the input image to a first resolution, wherein the low-resolution style exemplars have the first resolution and the intermediate image is generated with the first resolution; and obtaining the second image data by upsampling, to a second resolution, the intermediate image or an additional intermediate image having a higher resolution than the intermediate image, wherein the high-resolution style exemplars have the second resolution and the stylized output image is generated with the first resolution.

11. The system of claim 9, wherein the multimodal style-transfer network comprises a feed-forward neural network with subnets that include the low-resolution-based stylization subnet and the high-resolution stylization subnet, wherein the multimodal style-transfer network is trained by iteratively performing operations comprising:

computing stylization losses for the subnets, wherein a stylization loss for a subnet is computed from a combination of:

(i) a content loss weighted with a content weight, wherein the content loss indicates a difference in semantic content between the input image and an output of the subnet, and (ii) a texture loss weighted with a texture weight, wherein the texture loss indicates a difference in texture between the style exemplar and the output of the subnet; and adjusting the feed-forward neural network based on one or more of the stylization losses.

12. The system of claim 11, wherein adjusting the feed-forward neural network based on the stylization losses comprises:

computing, for each subnet and in each iteration, a respective hierarchical stylization loss for a respective set of subsequent subnets in the feed-forward neural network, wherein each hierarchical stylization loss is computed from a respective weighted combination of stylization losses for the respective set of subsequent subnets; and modifying the feed-forward neural network such that each hierarchical stylization loss is minimized, wherein the processing device is configured to cease the iteration based on each hierarchical stylization loss being minimized.

13. The system of claim 12, wherein the low-resolution-based stylization subnet has a first content weight and a first texture weight that is less than the first content weight, wherein the high-resolution stylization subnet has a second content weight and a second texture weight that is greater than the first content weight.

14. The system of claim 11, wherein the processing device is configured to compute a stylization loss for the high-resolution stylization subnet with respect to the stylized output image having the sum.

15. The system of claim 9, wherein the multimodal style-transfer network is a convolutional neural network having a first set of layers comprised in the low-resolution-based stylization subnet and a second set of layers comprised in the high-resolution stylization subnet, wherein the high-resolution stylization subnet receives one or more of (i) an output of the low-resolution-based stylization subnet and (ii) image data generated from the output of the low-resolution-based stylization subnet.

16. A non-transitory computer-readable medium storing program code executable by a processing device to perform operations, the operations comprising:

a step for accessing an input image and a style exemplar;

a step for transforming the input image into a stylized output image by applying a first style feature and a second style feature from the style exemplar to the input image, wherein applying the first style feature and the second style feature comprises:

providing the input image to a multimodal style-transfer network having a low-resolution-based stylization subnet and a high-resolution stylization subnet, generating, by the low-resolution-based stylization subnet, an intermediate image by applying the first style feature from a low-resolution version of the style exemplar to first image data obtained from the input image, wherein the low-resolution-based stylization subnet is trained with low-resolution style exemplars to apply the first style feature, providing second image data obtained from the intermediate image to an input of the high-resolution stylization subnet, wherein the high-resolution stylization subnet is trained with high-resolution style exemplars to apply the second style feature, wherein the high-resolution stylization subnet comprises an identity connection from the input of the high-resolution stylization subnet to an output of the high-resolution stylization subnet, and generating, by the high-resolution stylization subnet, the stylized output image by applying the second style feature from a high-resolution version of the style exemplar to the second image data, wherein the stylized output image comprises a sum of (i) the second image data received at the input of the high-resolution stylization subnet via the identity connection and (ii) third image data generated by the high-resolution stylization subnet transforming the second image data; and a step for causing an output device to display the stylized output image.

17. The non-transitory computer-readable medium of claim 16, the operations further comprising:

a step for obtaining the first image data by downsampling the input image to a first resolution, wherein the low-resolution style exemplars have the first resolution and the intermediate image is generated with the first resolution; and a step for obtaining the second image data by upsampling, to a second resolution, the intermediate image or an additional intermediate image having a higher resolution than the intermediate image, wherein the high-resolution style exemplars have the second resolution and the stylized output image is generated with the first resolution.

18. The non-transitory computer-readable medium of claim 16, wherein the multimodal style-transfer network comprises a feed-forward neural network with subnets that include the low-resolution-based stylization subnet and the high-resolution stylization subnet, wherein the operations further comprise training the multimodal style-transfer network by iteratively performing additional operations comprising:

computing stylization losses for the subnets, wherein a stylization loss for a subnet is computed from a combination of:

(i) a content loss weighted with a content weight, wherein the content loss indicates a difference in semantic content between the input image and an output of the subnet, and (ii) a texture loss weighted with a texture weight, wherein the texture loss indicates a difference in texture between the style exemplar and the output of the subnet; and adjusting the feed-forward neural network based on one or more of the stylization losses.

19. The non-transitory computer-readable medium of claim 18, wherein adjusting the feed-forward neural network based on the stylization losses comprises:

computing, for each subnet and in each iteration, a respective hierarchical stylization loss for a respective set of subsequent subnets in the feed-forward neural network, wherein each hierarchical stylization loss is computed from a respective weighted combination of stylization losses for the respective set of subsequent subnets; and modifying the feed-forward neural network such that each hierarchical stylization loss is minimized, wherein the iteration ceases based on each hierarchical stylization loss being minimized.

20. The non-transitory computer-readable medium of claim 19, wherein the low-resolution-based stylization subnet has a first content weight and a first texture weight that is less than the first content weight, wherein the high-resolution stylization subnet has a second content weight and a second texture weight that is greater than the first content weight.

* * * * *